United States Patent
Tomaru et al.

(10) Patent No.: US 6,711,965 B2
(45) Date of Patent: Mar. 30, 2004

(54) ELECTRIC STEERING COLUMN APPARATUS

(75) Inventors: Masaki Tomaru, Shibukawa (JP); Isamu Chikuma, Maebashi (JP); Sakae Matsumoto, Takasaki (JP); Kazuya Fukuda, Gunma-ken (JP); Takahiro Saito, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/133,753

(22) Filed: Apr. 29, 2002

(65) Prior Publication Data

US 2002/0124677 A1 Sep. 12, 2002

Related U.S. Application Data

(63) Continuation of application No. 09/467,917, filed on Dec. 21, 1999, now abandoned.

(30) Foreign Application Priority Data

| Dec. 25, 1998 | (JP) | 10-369362 |
| Jun. 3, 1999 | (JP) | 11-156988 |
| Jul. 1, 1999 | (JP) | 11-187909 |
| Nov. 10, 1999 | (JP) | 11-319896 |

(51) Int. Cl.$^7$ ................................. B62D 1/18
(52) U.S. Cl. .................. 74/493; 280/775; 318/470; 701/49
(58) Field of Search .............. 74/493; 280/775; 318/466, 470; 701/49

(56) References Cited

U.S. PATENT DOCUMENTS

| 3,216,521 A | 11/1965 | Ulrich .................... 280/775 X |
| 4,430,779 A | 2/1984 | Rockman et al. ............. 26/18.5 |
| 4,503,504 A | 3/1985 | Suzumura et al. ...... 318/466 X |
| 4,691,587 A | 9/1987 | Farrand et al. ............... 74/493 |
| 4,893,518 A | 1/1990 | Matsumoto et al. .......... 74/493 |
| 5,035,446 A | 7/1991 | Arvidsson ................... 280/775 |
| 5,115,421 A | 5/1992 | Rokutan ................. 369/44.33 |
| 5,270,932 A | 12/1993 | Yoshizawa et al. ..... 280/775 X |
| 5,803,630 A | 9/1998 | Barrus et al. ............... 400/323 |

FOREIGN PATENT DOCUMENTS

| DE | 32 29 481 | 3/1983 |
| DE | 38 90 516 | 3/1990 |
| DE | 42 17 664 | 12/1992 |
| EP | 0 782 951 | 7/1997 |
| JP | 5-29979 | 7/1993 |
| JP | 7-506308 | 7/1995 |

OTHER PUBLICATIONS

WO 93/09015, Published May 13, 1993 (Abstract).
WO 88/10205, Published Dec. 29, 1988 (Abstract).

*Primary Examiner*—David Fenstermacher
(74) *Attorney, Agent, or Firm*—Miles & Stockbridge, P.C.

(57) ABSTRACT

An electric tilt and/or telescopic steering column apparatus comprises a steering shaft having a steering wheel mounted on a rear end thereof, a steering column for rotatably supporting the steering shaft, an electric actuator for adjusting the tilt and/or telescopic position of the steering shaft by driving this steering column, and position detecting means for detecting the position of the steering shaft in a non-contact manner.

12 Claims, 22 Drawing Sheets

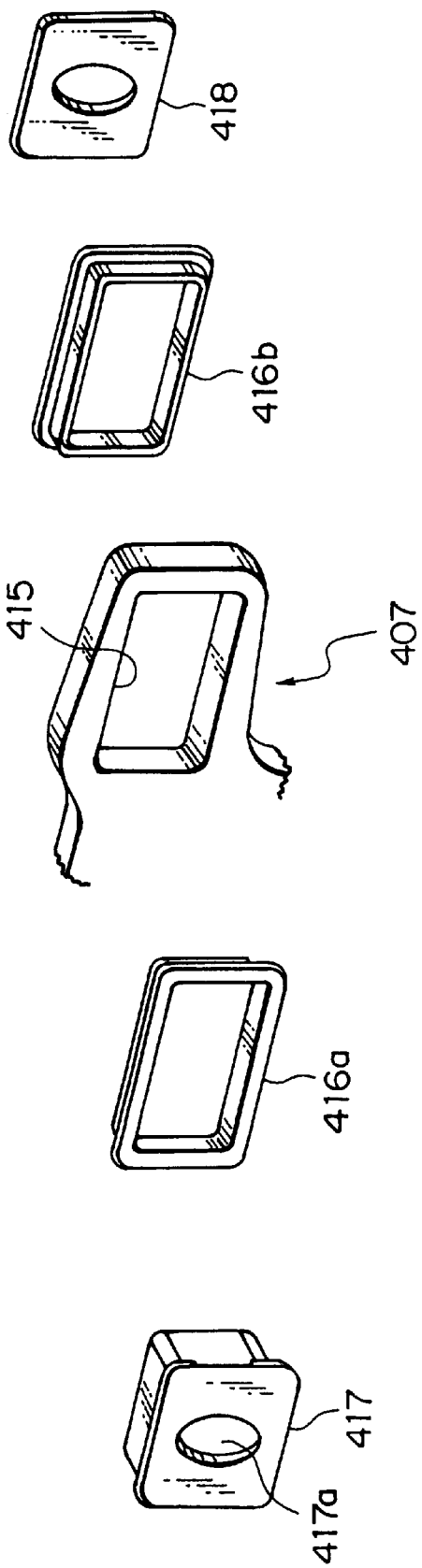

ELECTRIC STEERING COLUMN APPARATUS

CROSS-REFERENCE TO RELATED APPLICATION

This application is a continuation of application Ser. No. 09/467,917 filed Dec. 21, 1999, now abandoned and this application claims the benefit of Japanese Application Nos. 10-369362 and 11-156988, 11-187909 and 11-319896, which are hereby incorporated by reference.

FIELD OF THE INVENTION

The present invention relates to an electric steering column apparatus which holds a steering shaft to be rotatable and can electrically adjust the position of a steering wheel.

RELATED BACKGROUND ART

A conventional electric steering column apparatus is disclosed, for example, in Japanese Patent No. 2647476. In this apparatus, since a steering wheel is arranged at desired axial position and vertical position, the arrangement is such that a tilt joint or a telescopic joint is provided and a tilt position or a telescopic position of the steering wheel can be adjusted by means of an actuator which comprises an electric motor and a screw mechanism. Then, there is also provided a switch mechanism by which the electric motor is operated only when a working force of a predetermined level or higher is applied in a predetermined direction of the steering wheel, so as to electrically adjust the tilt position or the telescopic position (axial position) of the steering wheel.

However, in the above-mentioned electric steering column apparatus, the tilt position or the telescopic position of the steering wheel can not be detected. It is important to detect the position of the steering wheel, in order to finely adjust or control the position of the steering wheel. When the position of the steering wheel is to be detected, a brush or a rotary encoder or a linear encoder using a variable resistance, or the like, is usually employed. However, with such means, accurate detection may not be obtained due to abrasion of contacts, etc., for a long term use.

Also in the above-mentioned electric steering column apparatus, a tilt actuator (that is, an actuator for adjusting the tilt position of the steering wheel) and a telescopic actuator (that is, an actuator for adjusting the telescopic position of the steering wheel) are different components separately provided, so that the number of the constituent parts for steering must be increased, which causes a decline of mass productivity, etc., of the actuator and necessity for selecting two kinds of actuators in assembling the steering apparatus, and, in consequence, hinders the reduction in the manufacturing cost and the assembling steps.

For example, the electric tilt steering apparatus is generally arranged such that a rod is extended or contracted through a worm gear by an electric motor provided on a lower steering column, and an upper steering column coupled to an end of this rod through a bracket is moved in an inclined manner, whereby an angle of inclination of the steering wheel is adjusted to a desired angle.

In an electric tilt steering apparatus of a so-called upper part rocking type disclosed, for example, in Japanese Utility Model Publication No. 5-29979, an upper steering shaft is rockably coupled to a lower steering shaft through a universal joint and an upper steering column is rockably coupled to a lower steering column through a pin, correspondingly thereto. An electric motor for extending or contracting a rod through a worm gear is mounted on the lower steering column, and an end of this rod is coupled to a bracket which is provided on the upper steering column. With such arrangement, the rod is extended or contracted by the electric motor to incline the upper steering column with respect to the lower steering column fixed to the car body, thereby adjusting an angle of inclination of the steering wheel.

On the other hand, in an electric tilt steering apparatus of a so-called lower part rocking type disclosed in PCT Japanese Phase Publication No. 7-506308, a steering column is arranged to be integrally inclined with the position of a universal joint provided in a lower part of a steering shaft, as a center of a tilt movement, while the steering column is arranged to be movable a little in the axial direction with no tilt center, such as a pin. Further, a bell crank which is rocked by an electric motor is coupled to this steering column, whereby the bell crank is rocked by driving the electric motor so as to incline the steering column. When this bell crank is rocked, an axial force is generated to move the steering column in the axial direction. However, since the steering column is arranged to be freely movable in the axial direction, this axial force can be absorbed.

However, in the electric tilt steering apparatus of the so-called upper part rocking type disclosed in the above-mentioned Japanese Utility Model Publication No. 5-29979, both the steering shaft and the steering column are divided into upper and lower parts, respectively, which is disadvantageous in terms of the manufacturing cost because of the increased number of the constituent parts.

Also, since the rod of the electric motor is arranged to support the upper steering column and the upper steering shaft, if a load (vibration) is input downward and toward a front part of the car from the steering wheel side, this load (vibration) in the vertical direction directly works upon the rod and the rod receives most of this load (vibration). For this reason, the rigidity of this rod is required to be very high, and measures for suppressing backlash which may caused by the vibration of the rod are required to be fully taken.

Further, in the electric tilt steering apparatus of the so-called lower part rocking type disclosed in PCT Japanese phase Publication No. 7-506308, since the steering column has no tilt center such as a pin, if a load (vibration) is input downward and toward a front part of the car from the steering wheel side, this load (vibration) in the vertical direction directly works upon the telescopic portion of the steering shaft and this telescopic portion receives most of this load (vibration). For this reason, in order to secure a smooth operation of this telescopic portion or to prevent backlash due to the vibration of the telescopic portion, full measures are required to be taken for the telescopic portion.

SUMMARY OF THE INVENTION

The present invention was contrived taking the above circumstances into consideration, and an object of first and second aspects of the invention is to provide an electric steering column apparatus which can detect the tilt position or the telescopic position of the steering wheel easily and accurately and can realize reduction in the manufacturing cost by rendering the constituent parts for common use.

According to the first aspect of the present invention, there is provided an electric steering column apparatus which comprises a steering shaft having a steering wheel mounted on a rear end thereof, a steering column for rotatably supporting this steering shaft, an electric actuator for adjusting the position of the steering shaft by driving this steering column, and position detecting means for detecting the position of the steering shaft in a non-contact manner.

In this electric steering column apparatus, since the position detecting device detects the position of the steering shaft in a non-contact manner, it becomes possible to detect the position of the steering wheel easily and accurately, whereby it also becomes possible to finely adjust or accurately control the position of the steering shaft. Note that if the position of the steering shaft is detected by a sensor of a contact type, such as a direct-acting resistance sensor, such sensor is inferior to that of the non-contact type in terms of the durability, and an accuracy in the position detection is declined since a range of a difference in voltage is not fully secured. Further, such non-contact type sensor is less influenced by noises and a fluctuation in temperature, compared with that of a contact type.

Note that the position of the steering wheel denotes the tilt position which is corresponding to an inclination of the steering wheel, or the telescopic position (axial position) corresponding to an amount of the movement of the steering wheel due to the telescopic movement of the steering shaft.

The position detecting device preferably effects detection digitally. The position detecting device may be constituted by, for example, a magnetic pulser device for generating a signal corresponding to a rotation of the electric motor, an optical pulser device, a dielectric pulser device, an electric capacity pulser device, etc. With such arrangement, it becomes possible to conduct reliable position detection with high durability and high reproducibility.

A pulser device for forming the position detecting device may be arranged integrally with the electric motor. With this arrangement, it becomes possible to conduct position detection based on an amount of rotation of the electric motor, so that the position detecting device can be made compact and precise, and the position detection of the steering wheel can be conducted simply with precision.

Also, if the electric motor is a DC brush motor, it is possible to effect the position control by using a ripple voltage or a high level noise as a pulse. Further, if the electric motor is a DC brushless motor provided with a rotation position detecting mechanism comprising a Hall element, a tacho-generator, and the like, it becomes possible to detect the position of the steering wheel on the basis of an output from such rotation position detecting mechanism.

When the position detecting device is integrally formed with the electric motor, an appropriate extension/contraction mechanism is further provided for shifting the steering column by converting a rotation of the electric motor into a linear movement and this extension/contraction mechanism, the electric motor, and the position detecting device can be formed in a unitary structure. When the tilt position and the telescopic position of the steering wheel are adjusted independently of each other, the extension/contraction mechanism, the electric motor, and the position detecting device formed in a unitary structure as mentioned above can be provided for each of the tilt position and the telescopic position. In this manner, it is possible to reduce the number of steps for the adjustment and the number of kinds of the constituent parts, to thereby save the manufacturing cost.

According to the second aspect of the present invention, there is proposed an electric steering column apparatus which comprises a steering shaft having a steering wheel at the read end thereof, a steering column for rotatably supporting this steering shaft, and capable of a tilt movement around a tilt pivot and a telescopic movement along the axial direction of the steering shaft, an electric tilt actuator used for the tilt movement of the steering column, in which the electric tilt actuator and the electric telescopic actuator have one and the same structure and are composed of the same parts, respectively.

According to this invention, since the electric tilt actuator and the electric telescopic actuator have one and the same structure and are composed of the same parts respectively, it is possible to cut down a metal mold for producing the main body of the actuator and to enhance the mass productivity thereof. Additional, it is possible to realize facilitation of the assembling works and rationalization of the assembling steps.

In an electric steering column apparatus according to the first or second aspect of the present invention, the electric actuator comprises an electric motor which is supported by the main body of the actuator and a rod driving mechanism, and the rod driving mechanism can be provided with a gear shaft which comprises a driven gear portion to be driven by a driving gear on the electric motor side and a shaft portion rotatably held on the main body of the actuator through a bearing. According to this invention, it is possible to easily realize enhancement of the mass productivity of the apparatus and reduction in weight, by forming the gear shaft in a unitary structure of synthetic resin.

Also, in the above-mentioned electric steering column apparatus of the present invention, it is possible to form a first deformation portion projecting from the inner diameter of the bearing on the outer peripheral surface of the shaft portion. According to this feature of the present invention, it is possible to maintain a constant pressing force for thrusting the shaft into the inner race of the bearing, by forming ridges or annular protrusions, or the like, as the first deformation portion, for example, on the outer peripheral surface of the shaft portion, and plastically or elastically deform the first deformation portion. Thus, an amount of deformation (an amount of contraction of the size) of the shaft portion can be prevented from being unnecessarily large.

Also, according to this feature of the present invention, in the above-mentioned electric steering column apparatus, a second deformation portion which is in contact with a side of the inner race of the bearing can be formed on a side of the driven gear. According to this feature, it is possible to control preload of the bearing in assembling easily and with certainty, by forming radial ridges or concentric protrusions, or the like, as a second deformation portion, for example, on a side of the driven gear, and plastically or elastically deforming the second deformation portion.

Also, according to the present invention, in the above-mentioned electric steering column apparatus, there may be provided an actuator rod with a female screw formed on the axis of the gear shaft and a male screw to engage the actuator with the female screw, and a groove for retaining lubricating oil may be formed on the female screw. According to this feature of the present invention, if, for example, metric thread screws which can be easily processed are employed as the female screw and the male screw, the engaged portion can be lubricated with grease, or the like, supplied from the lubricating oil retaining groove. Thus, it is possible to obtain a smooth operation and long-term durability of the apparatus.

Also according to the present invention, in the above-mentioned electric steering column apparatus, the driven gear portion can be constituted by a gear base, a ring gear fitted on this gear base, and an elastic member interposed between the gear base and the ring gear. According to this feature of the invention, it is possible to reduce backlash sound or the like at the time of reversal rotation of the electric motor, as well as abrasion of the driving gear and the ring gear.

According to a third aspect of the present invention, it is aimed to provide an automatic tilt or telescopic type steering apparatus on which a bracket on the inner barrel side to be coupled to a rod of a drive portion for a tilt or telescopic operation can be fixedly mounted with accuracy by a simple method. In order to achieve this object, there is provided, according to the third aspect of the present invention, an automatic tilt telescopic type steering apparatus in which an inner column member of a steering column is slidably fitted in an outer column member to extend or contract a rod of a drive portion to thereby move the inner column member in the back and forth direction of the car with respect to the outer column member, whereby the axial length of the steering column and an angle of inclination of the column are automatically adjusted. Such steering apparatus is characterized in that a bracket on the inner column member side to be coupled to the rod of the drive portion comprises an auxiliary member attached to the inner side of the inner column member in advance, and the main body of the bracket to be assembled in this auxiliary member through an opening of this inner column member.

As described above, according to the third aspect of the present invention, it will be suffice if the bracket on the inner column member side to be coupled to the rod of the drive portion is formed by assembling the main body of the bracket in the auxiliary member through the opening of the inner column member, after attaching the auxiliary member to the inner side of the inner column member in advance. Accordingly, the bracket can be attached very easily, and moreover, the bracket can be attached fixedly with accuracy without welding or other processing. Further, sliding movement of the inner column member with respect to the outer column member can be conducted smoothly. In addition, the manufacturing cost is not increased and the size of the apparatus can be reduced.

According to a fourth aspect of the present invention, it is aimed to provide an automatic tilt steering apparatus which does not incur rise in the manufacturing cost and does not require a high rigidity for the rod and high-level measures for preventing backlash.

In order to achieve this object, according to the fourth aspect of the present invention, there is provided an automatic tilt steering apparatus for adjusting an angle of inclination of a steering wheel by automatically inclining a steering column, characterized in that:

a tilt center is provided at the lower end of the steering column in a front part of the car so that the steering column is integrally moved in an inclined manner, while a universal joint is provided at the lower end in the front part of the car so that the steering shaft can be also moved in an inclined manner correspondingly to this tilt center;

a rod to be extended and/or contracted by a drive portion is engaged with a tilt rocking member which is rockably provided on the car body through a bracket, while a slide frame portion is provided on this tilt rocking member for causing a sliding piece projecting from the steering column to slide; and in consequent, when the rod of the drive portion is extended and/or contracted and the tilt rocking member is caused to rock, the sliding piece is caused to rock, while sliding inside the slide frame portion, together with the steering column, so as to incline this steering column.

As described above, according to the fourth aspect of the present invention, there is arranged a so-called lower part rocking type steering apparatus in which the tilt center is provided at the lower end of the steering column in a front part of the car to move the steering column integrally in an inclined manner, while the universal joint is provided at the lower end in the front part of the car so that the steering shaft can be also inclined correspondingly to this tilt center.

Also, while the rod which is extended or contracted by the drive portion is engaged with the tilt rocking member which is rockably provided on the car body through the bracket, the slide frame portion for causing the sliding piece projecting from the steering column to slide is provided on this tilt rocking member. With this arrangement, at the time of tilt adjustment, the tilt rocking member is rocked by extending or contracting the rod of the drive portion, whereby this steering column is moved in an inclined manner while the sliding piece is caused to slide inside the slide frame portion to be rocked together with the tilt rocking member.

Accordingly, since this steering apparatus is not of the so-called upper part rocking type, there is no need to divide the steering shaft and the steering column into upper and lower parts, whereby the number of the constituent parts can be decreased to reduce the manufacturing cost.

Also, when a load (vibration) is input downward in a front part of the car from the steering wheel side, this load (vibration) in the vertical direction indirectly works upon the rod at a predetermined lever ratio through the tilt rocking member, so that the rigidity of the rod is not required to be very high and very high level measures are not required for preventing a backlash which may be caused by the vibration.

Further, in PCT Japanese Phase Publication No. 7-506308, the bell crank is rocked to move the steering column in an inclined manner at the time of tilt adjustment. However, in this case, the bell crank is not only rocked, but is moved in the axial direction, so that the movement of this bell crank in the axial direction is absorbed due to the structure in which the steering column is freely moved in the axial direction. However, with this structure, a tilt center such as a pin can not be provided on the steering column, and the steering column cannot receive a load or vibration in the axial direction from the steering wheel.

On the other hand, according to the fourth aspect of the present invention, it is arranged such that, at the time of tilt adjustment, the tilt rocking member is rocked and the sliding piece is rocked together with the steering column while sliding in the slide frame portion, so that the movement in the axial direction generated in the tilt rocking member is absorbed by causing the sliding piece to slide in the slide frame portion. For this reason, a tilt center such as a pin can be arranged at the lower end of the steering column and the steering column can receive a load or vibration in the axial direction from the steering wheel.

BRIEF DESCRIPTION OF THE DRAWINGS

FIG. 27 includes exploded perspective views for respectively showing the sliding piece and the slide frame portion in an exploded manner.

DETAILED DESCRIPTION OF THE PREFERRED EMBODIMENTS

Embodiments of an electric steering column apparatus according to the present invention will be described below with reference to drawings.

Figure 1:
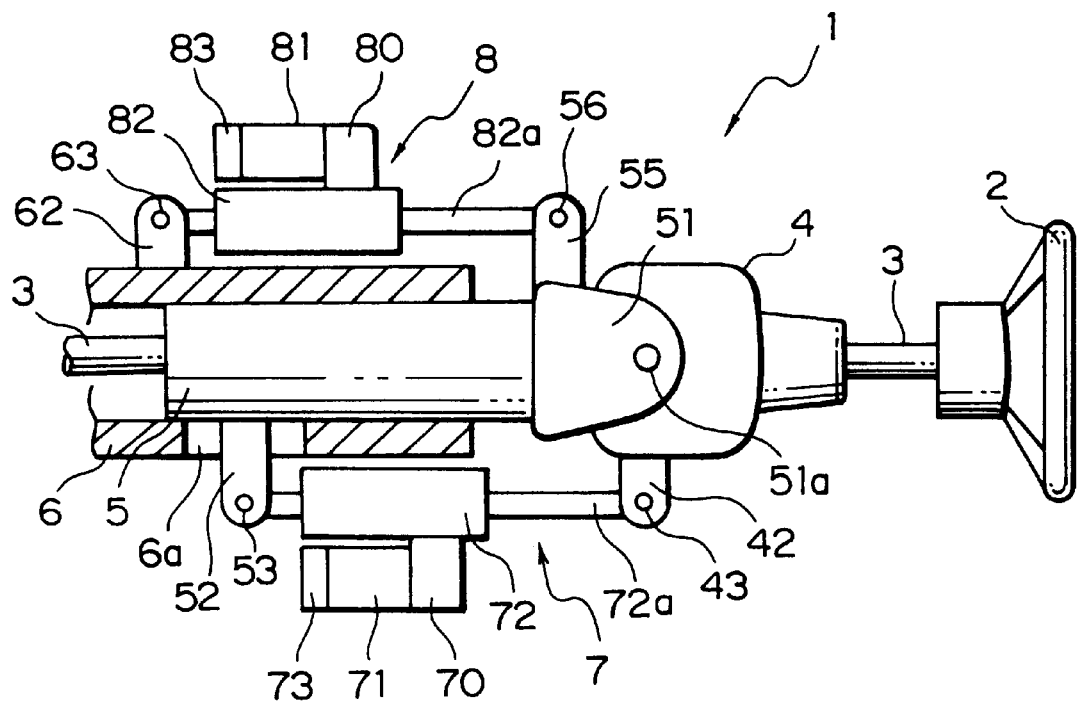
FIG. 1 is a schematic constitutional view for showing an electric steering column apparatus according to a first embodiment of the present invention.

FIG. 1 is a schematic constitutional view for showing an electric steering column apparatus according to the first embodiment of the present invention. This electric steering column apparatus 1 employs a so-called upper part rocking type tilt scheme, and is provided with three steering columns, that is, an upper column 4, a middle column 5 and a lower column 6, for holding rotatably around the axis thereof a steering shaft 3 which extends from a steering wheel 2 to a steering gear (omitted in the drawing). Then, relative positions of the columns 4, 5, 6 are properly adjusted, whereby the steering shaft 3 and, in consequence, the steering wheel 2 can be held at desired positions.

The upper column 4 receives a universal joint (omitted in the drawing) of the steering shaft 3 in its inner space. The upper column 4 is attached to a forked portion 51 formed at the rear end of the middle column 5 to be capable of tilting through a hinge pin 51a. That is, it is possible to adjust the tilt position of the steering wheel 2, by properly rocking the upper column 4 with the hinge pin 51a serving as the pivot.

The middle column 5 is fitted in and held by the lower column 6, and is arranged to be slidably movable in the axial direction together with the forked portion 51 for supporting the upper column 4. That is, it is possible to adjust the telescopic position of the steering wheel 2 by properly moving the middle column 5 back and forth with respect to the lower column 6 fixed to the car body and to move the upper column 4 together with the steering shaft 3 in the axial direction thereof.

The tilt position of the upper column 4 is adjusted by an electric tilt actuator 7. This electric tilt actuator 7 comprises as its main constituent elements an electric motor 71 with a gear box 70 which is additionally provided, an extension/contraction rod device 72 to be driven by this electric motor 71, and a position detecting device 73 for detecting an amount of rotation of the electric motor 71.

An actuator rod 72a extending from the extension/contraction rod device 72 is extended or contracted in accordance with a rotation of the electric motor 71, and an amount of this extension or contraction is detected digitally by the position detecting device 73 as the number of rotations of the electric motor 71.

The front end of the extension/contraction rod device 72 is pivotally attached to a bracket 52, which is fixed to the middle column 5, by means of a pin 53, so as to constitute a hinge. The rear end of the actuator rod 72a is pivotally attached to a bracket 42 fixed to the upper column 4 by means of a pin 43, so as to constitute another hinge. Accordingly, if the actuator rod 72a is gradually drawn from the extension/contraction rod device 72, the upper column 4 is smoothly rotated counterclockwise with respect to the middle column 5, so that the steering wheel 2 can be gradually inclined upward. On the other hand, if the actuator rod 72a is gradually received by the extension/contraction rod device 72, the upper column 4 is smoothly rotated clockwise with respect to the middle column 5, whereby the steering wheel 2 can be gradually inclined downward. An angle of inclination (tilt position) in this case can be obtained from an output of the position detecting device 73.

The telescopic position of the upper column 4 is adjusted by an electric telescopic actuator 8 which has substantially the same structure as the electric tilt actuator 7. More specifically, this electric telescopic actuator 8 comprises as its main constituent elements an electric motor 81 with a gear box 80 additionally provided, an extension/contraction rod device 82 to be driven by this electric motor 81, and a position detecting device 83 for detecting an amount of rotation of the electric motor 81.

The front end of the extension/contraction rod device 82 is pivotally attached to a bracket 62 fixed to the lower column 6 by means of a pin 63, so as to constitute a hinge. The rear end of the actuator rod 82a is pivotally attached to a bracket 55, which is fixed to the forked portion 51 of the middle column 5, by means of a pin 56, so as to constitute another hinge. Accordingly, if the actuator rod 82a is moved outward from the extension/contraction rod device 82, the middle column 5 is moved outward from the lower column 6, whereby the steering wheel 2 can be moved backward. On the other hand, if the actuator rod 82a is received in the extension/contraction rod device 82, the middle column 5 is moved into the lower column 6 so that the steering wheel 2 can be moved forward.

Note that the bracket 52 fixed to the middle column 5 is guided to a groove 6a which is formed on the lower column 6, so as to be slidably movable along the axial direction with respect to the lower column 6 together with the middle column 5.

Figure 2:
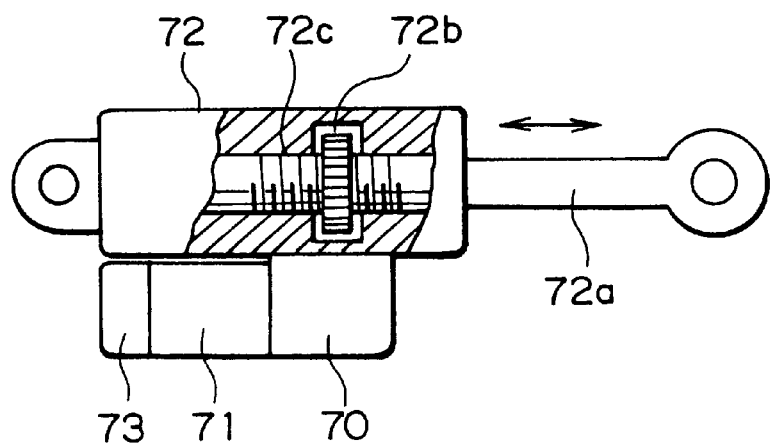
FIG. 2 is a partial transverse sectional view for illustrating a principal portion of a position adjustment mechanism according to the first embodiment.

FIG. 2 is a view for explaining the principal portion of the electric tilt actuator 7 according to the first embodiment. Referring to FIG. 2, a gear box 70 accommodates therein a plurality of gears (omitted in the drawing) coupled to the rotary shaft of the electric motor 71. The extension/contraction rod device 72 contains an annular gear 72b which rotates upon reception of the power from the gear box 70, and a rod base 72c which has a male screw formed on the periphery thereof and is engaged with a female screw formed on the inner diameter surface of the annular gear 72b. Since the electric telescopic actuator 8 also has the same or similar structure, description thereof is omitted here.

Figures 3A, 3B, 3C:
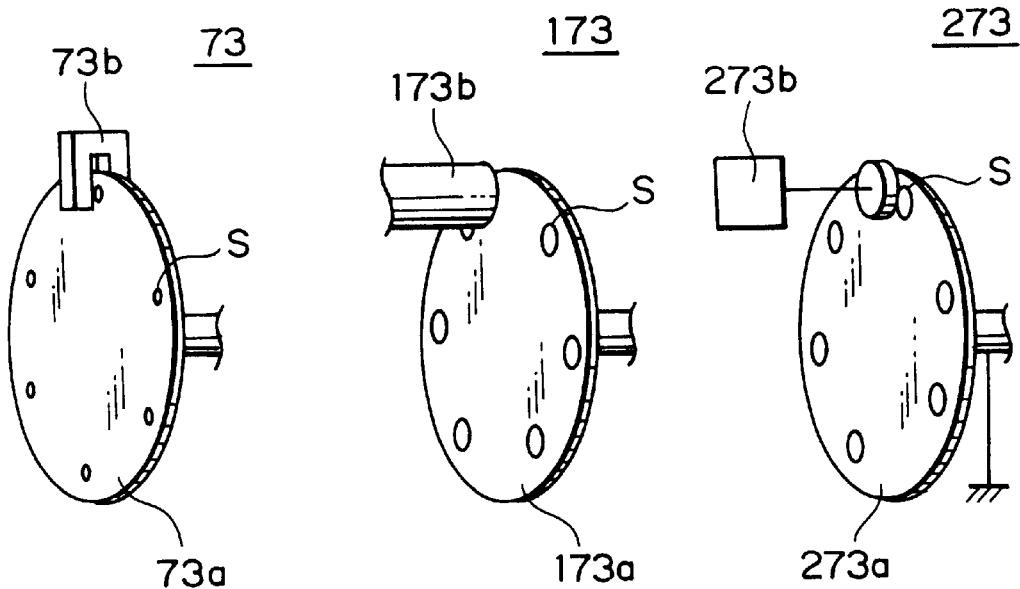
FIGS. 3A–3C are views for illustrating a method of detecting a position digitally.

FIGS. 3A, 3B and 3C are views for explaining the internal structure of the position detecting device 73, in which FIG. 3A shows an example of position detection, while FIG. 3B and FIG. 3C show variations thereof.

As shown in FIG. 3A, the position detecting device 73 comprises a disc-like photo-interrupter 73a which is rotated together with the electric motor 70 and a photo-coupler 73b which optically detects slits s formed on the photo-interrupter 73a in a non-contact manner. In case of the variation shown in FIG. 3B, a position detecting device 173 is provided with a disc-like magnetic pulser 173a for rotating together with the electric motor 71 and a magnetic sensor 173b for magnetically detecting magnetic slits s formed on the magnetic pulser 173a in a non-contact manner. In case of the variation shown in FIG. 3C, a position detecting device 273 is provided with a disc-like electrostatic pulser 273a for rotating together with the electric motor 71 and an electrostatic sensor 273b for detecting approximation of magnetic slits s formed on the magnetic pulser 173a by means of a polar plate in a non-contact manner. In the foregoing embodiments, the number of the slits s is set to be 6. However, the number of the slits s may be, for example, 4, so as to obtain four pulses for one rotation of the electric motor 71. That is, the number of the slits s can be properly adjusted in accordance with required accuracy.

Note that the position detecting device 73 may be composed of a disc-like dielectric pulser which rotates together with the electric motor 71, and a dielectric sensor for detecting approximation of an dielectric region formed on the dielectric pulser by means of a coil. In addition, if a DC brush motor is used as the electric motor 71, a ripple voltage or a high-order noise which is generated when the brush exceeds a commutator can be used as a position detection pulse. Further, if a DC brushless motor containing a Hall element or a tacho-generator is used as the electric motor 71, it is also possible to detect the position of the steering wheel on the basis of an output of the Hall element or the tacho-generator.

Figure 4:
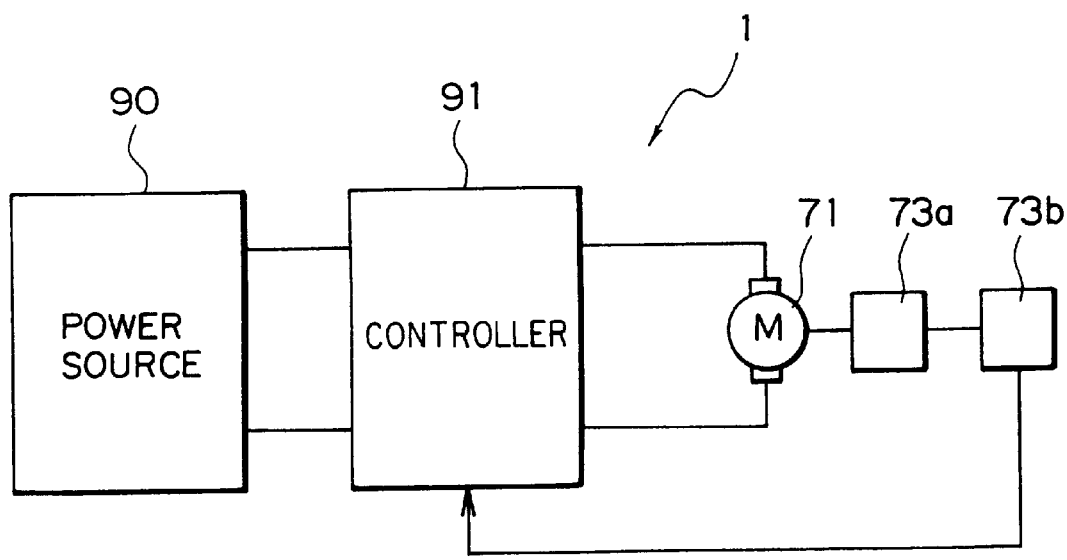
FIG. 4 is a view for schematically illustrating a control circuit of an electric motor.

FIG. 4 is a view for schematically explaining a control circuit of the electric motor 71. An amount of rotation of the electric motor 71 is controlled by a controller 91 which is connected to a power source 90. A detection output of the photo-coupler 73b which detects a rotation of the photo-interrupter 73a rotating together with the electric motor 71 is fed back to the controller 91. In addition, a set value for a tilt angle is supplied to the controller 91 from a main controller which is omitted in the drawing, and is converted into an amount of rotation of the electric motor 71, so that it is possible to attain the target tilt position of the steering wheel 2 by rotating the electric motor 71 in a desired direction while counting a pulse signal from the photo-coupler 73b. Note that a control circuit of the electric motor 81 of the electric telescopic actuator 8 is the same as that shown in FIG. 4 so that description thereof will be omitted.

Figure 5:
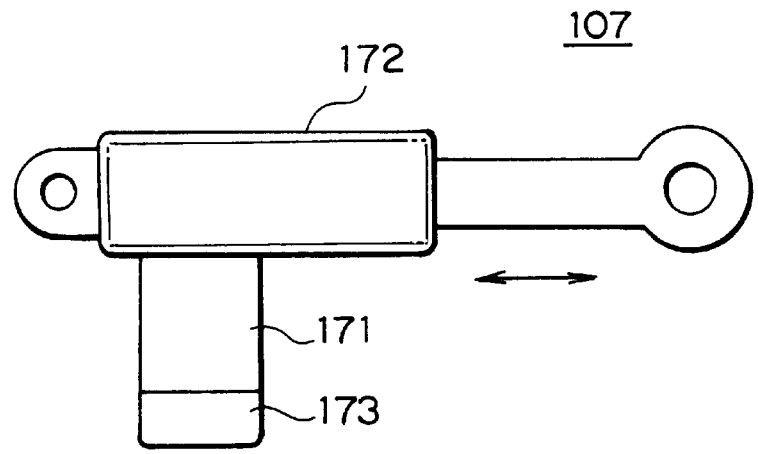
FIG. 5 is a view for illustrating a variation of the principal portion of the position adjustment mechanism.

FIG. 5 is a view for explaining a variation of the electric tilt actuator 7 shown in FIG. 2. Specifically, this electric tilt actuator 107 comprises as its main constituent elements an electric motor 171, an extension/contraction rod device 172 which is directly driven by this electric motor 171 through a worm wheel mechanism or the like, and a position detecting device 173 for detecting an amount of rotation of the electric motor 171.

Figure 6:
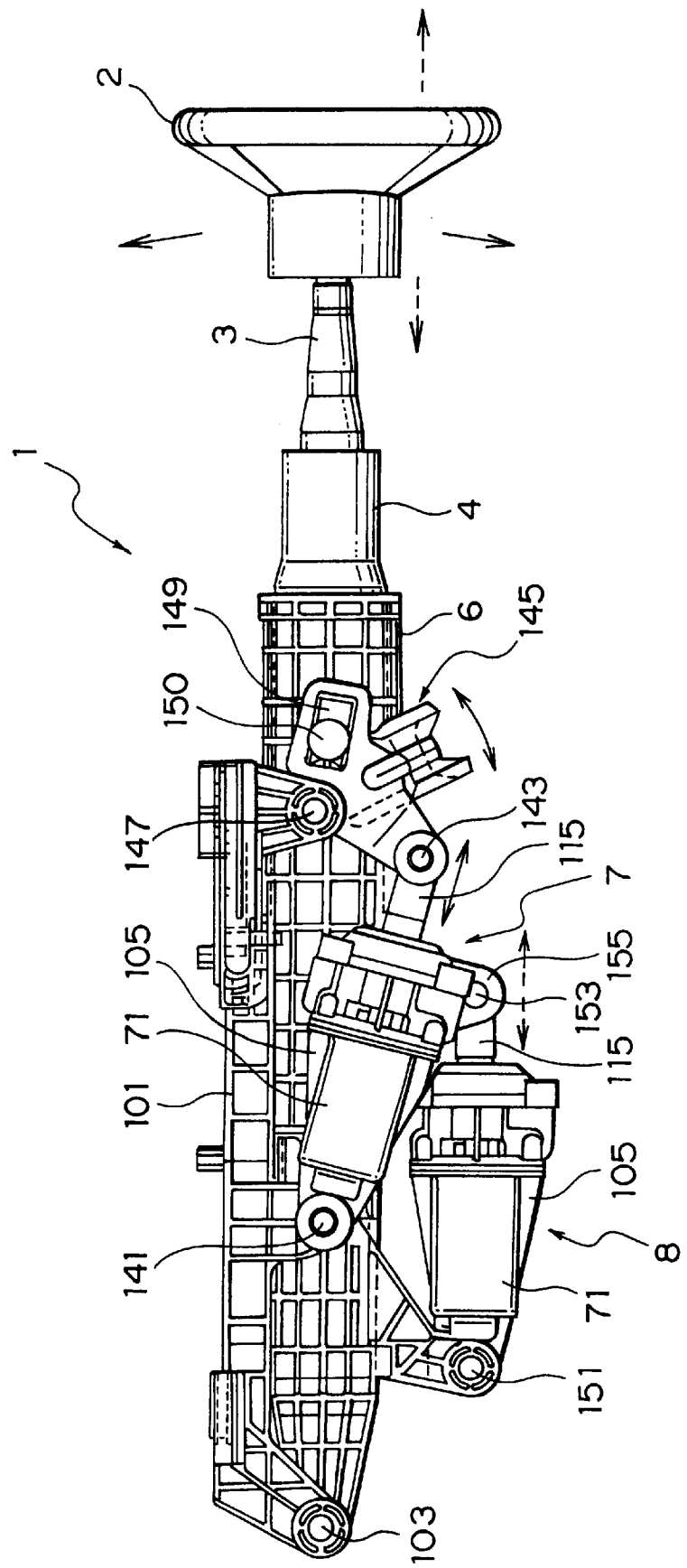
FIG. 6 is a schematic constitutional view for showing an electric steering column apparatus according to a second embodiment of the present invention.

FIG. 6 is a schematic constitutional view for showing an electric steering column apparatus according to the second embodiment of the present invention. This electric steering column apparatus 1 employs a so-called lower part rocking type tilt scheme, and is provided with two steering columns, that is, an upper column 4 and a lower column 6, for rotatably holding around the axis thereof a steering shaft 3 with a steering wheel 2 attached to the rear end thereof and a steering gear (omitted in the drawing) coupled to the front end thereof, and a fixed bracket 101 which is fixed to the car body. Then, the inclination of the both columns 4, 6 with respect to the fixed bracket 101 and the relative positions of the both columns 4, 6 are properly adjusted, whereby the steering shaft 3 and, in consequence, the steering wheel 2 can be held at desired positions.

The upper column 4 is formed of a steel pipe by pressing and, while rotatably holding the steering shaft 3 through a bearing (not shown), is fitted in and held by the lower column 6 to be slidably movable. The lower column 6 is a thin die cast product which is made of an aluminum alloy (hereinafter called the aluminum die cast product) and has a large number of ribs on the outer peripheral surface thereof to securely maintain the rigidity. The lower column 6 is coupled to the front end of the fixed bracket 101 to be freely rockable through a hinge pin 103. In consequent, it is possible to adjust the tilt positions of the steering shaft 3 and the steering wheel 2 by properly rocking the lower column 6 with respect to the fixed bracket 101. Note that in the present embodiment, the fixed bracket 101 is also an aluminum die cast product, similarly to the lower column 6.

In case of the present embodiment, the tilt position of the steering wheel 2 is adjusted by the electric tilt actuator 7.

Figure 7:
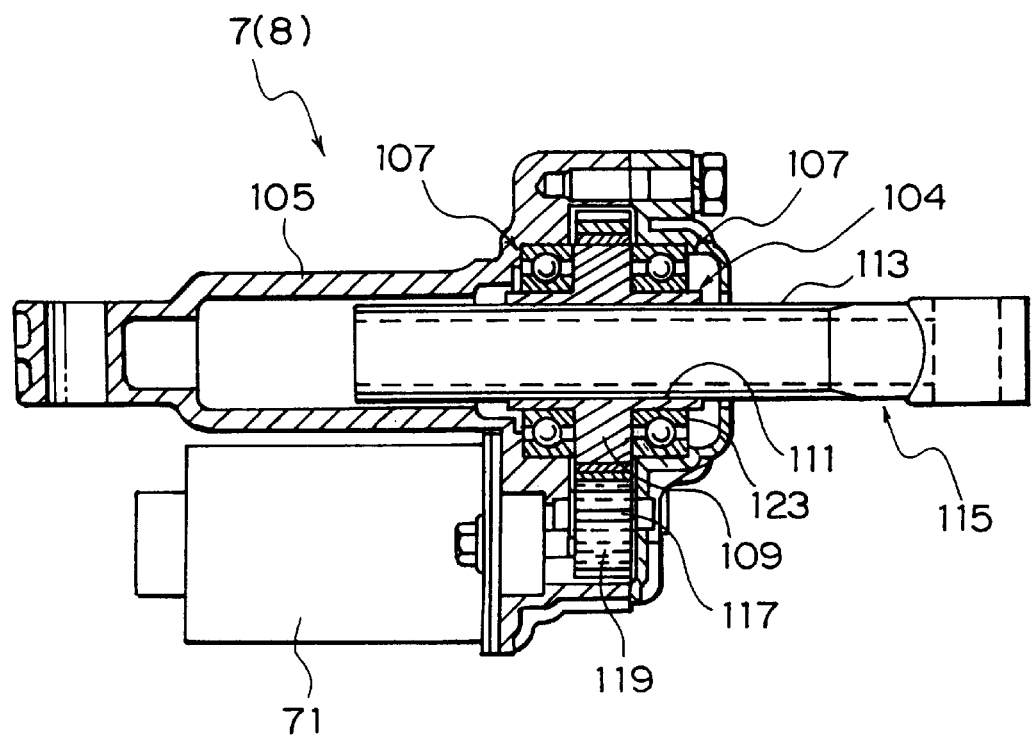
FIG. 7 is a transverse sectional view for showing an electric actuator according to the second embodiment.

The electric tilt actuator 7 is, as shown in the transverse sectional view of FIG. 7, comprised of the electric motor 71, a rod drive mechanism 104, an actuator main body 105 which is an aluminum die cast product used to hold the above components, and the like. The rod drive mechanism 104 comprises as its main constituent elements a gear shaft 109 which is rotatably supported by the actuator main body 105 through a pair of bearings 107, and a hollow actuator rod 115 having on the outer peripheral surface thereof a male screw 113 which is engaged with a female screw 111 formed on the axis of the gear shaft 109. Note that also in the second embodiment, there is provided position detecting means similar to that in the first embodiment. However, description of the detecting means will be omitted to prevent redundancy.

Figure 8:
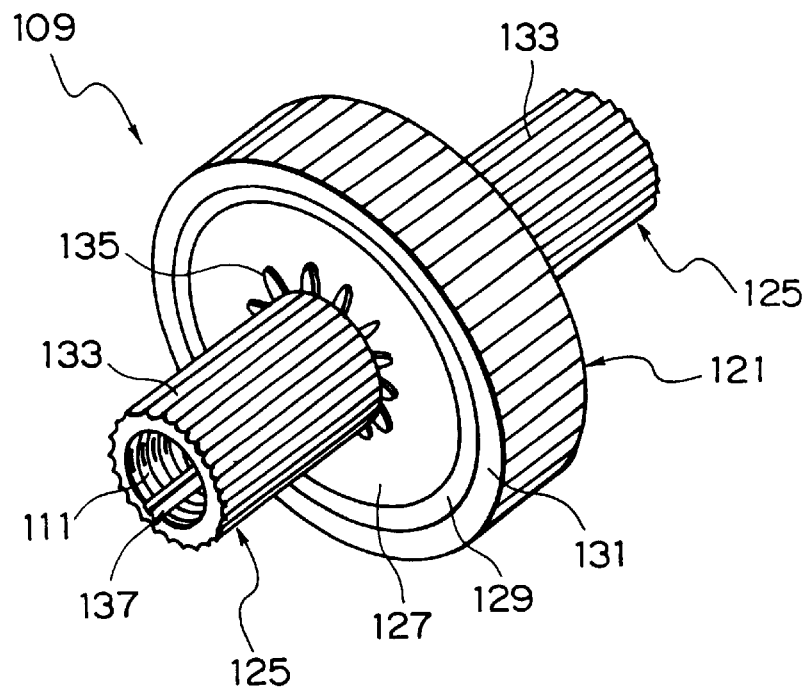
FIG. 8 is a perspective view for showing a gear shaft according to the second embodiment.

The gear shaft 109 in the present embodiment is a product formed of synthetic resin by injection molding and, as shown in a perspective view of FIG. 8, is comprised of a driven gear portion 121 which is driven by a driving gear 119 on the side of the electric motor 71 through an idler gear 117, and a pair of shaft portions 125 to be pressure-fitted into the inner races 123 of the bearings 107. Further, the driven gear portion 121 is comprised of a disc-like gear base 127 and a gear ring 131 which is a product formed of synthetic resin by injection molding to be fitted on this gear base 127 with a synthetic rubber ring 129 of a predetermined thickness (e.g., 1 mm to 3 mm) therebetween.

Since the electric tilt actuator 7 of the present embodiment employs such constitution, even if backlash is present between the driving gear 119 and idler gear 117 or between the idler gear 117 and the gear ring 131, the synthetic rubber ring 129 absorbs a shock caused by the backlash when the electric motor 71 is reversibly rotated, or the like, thereby reducing the noise.

While the shaft portion 125 is provided with a large number of ridges 133 which are formed in a serrate manner on the outer peripheral surface thereof along the axial direction as a first deformation portion, the driven gear portion 121 is provided with a large number of radial protrusions 135 which are formed on a side surface thereof as a second deformation portion. Further, a lubricating oil retaining groove 137 is formed on the shaft portion 125 along the axial direction thereof in such a manner that the groove 137 cuts a part of the female screw 111 away. Lubricant such as silicon grease is retained in this lubricating oil retaining groove 137. Note that in case of the present embodiment, metric-threaded screws which are easy to be processed are used as the female screw 111 of the gear shaft 109 and the male screw of the actuator rod 115, instead of trapezoidal threads which are conventionally used. The diameter of such metric-threaded screws is set to be comparatively large (e.g., M14 to M18).

Since the electric tilt actuator 7 of the present embodiment employs such configuration, when the shaft portion 125 is thrust with pressure into the inner races 123 of the bearings 107, the ridges 133 of the shaft portion 125 is plastically deformed (or elastically deformed) in a predetermined amount and contraction of the diameter of the shaft portion 125 due to the thrust hardly occurs. Consequently, it is possible to prevent pressure fixing between the female screw 111 and the male screw 113 while realizing secured attachment between the inner race 123 of the bearing 107 and the gear shaft 109, thereby realizing smooth operation of the rod drive mechanism 103. Also, when the gear shaft 109 and the bearings 107 are set in the actuator main body 105, the radial protrusions 135 of the driven gear portion 121 are plastically deformed (or elastically deformed) in a predetermined amount so that preload on the bearings 107 can be controlled very easy. Further, since the lubricating oil retaining groove 137 which retains lubricant therein is formed on the female screw 111, while metric-threaded screws are used as the female screw 111 and the male screw 113, satisfactory lubrication is effected in the engaged portion therebetween so that smooth operation of the rod drive mechanism 103 can be realized.

Incidentally, in case of the present embodiment, while in the electric tilt actuator 7 the front end of the actuator main body 105 is connected to the lower column 6 to be freely rockable through a pin 141, the rear end of the actuator rod 115 is coupled to the front end of the tilt rocking member 145 made of press-formed steel plate through a pin 143. An upper part of the middle part of the tilt rocking member 145 is rockably supported by the fixed bracket 101 through a pin 147, while a pin 150 fixed to the lower column 6 is fitted in a rectangular hole 149 formed at the rear end of the tilt rocking member 145.

In consequence, when the actuator rod 115 is moved outward from the main body 105 of the electric tilt actuator 7, the tilt rocking member 145 is rotated counter-clockwise in FIG. 6 and the lower column 6 is rocked downward together with the upper column 4 and the steering shaft 3, using the hinge pin 103 as the pivot, thereby tilt-adjusting the steering wheel 2 upward. On the other hand, when the actuator rod 115 is moved or received into the main body 105 of the electric tilt actuator 7, the tilt rocking member 145 is rotated clockwise in FIG. 6 and the lower column 6 is rocked downward together with the upper column 4 and the steering shaft 3, using the hinge pin 103 as the pivot, thereby tilt-adjusting the steering wheel 2 downward.

On the other hand, since the upper column 4 is slidably fitted in and held by the lower column 6, if the upper column 4 is moved outward from or moved forward to the lower column 6, the telescopic positions of the steering shaft 3 and the steering wheel 2 can be adjusted.

In case of the present embodiment, the telescopic position of the steering wheel 2 is adjusted by the electric telescopic actuator 8. The electric telescopic actuator 8 is entirely the same as the electric tilt actuator 7, except its assembled manner. In other words, the structure of the telescopic actuator 8 is the same as that of the tilt actuator 7, and both actuators 8 and 7 are composed of the same parts or components, respectively. Specifically, in the electric telescopic actuator 8, the front end of the actuator main body 105 is coupled to the lower column 6 through a pin 151, while the rear end of the actuator rod 115 is coupled through a pin 153 to a stay 155 which is made of steel plate and fixed to the upper column 4.

With such arrangement, when the actuator rod 115 is moved out from the main body 105 of the electric telescopic actuator 8, the upper column 4 and the steering shaft 3 are moved backward together with the stay 155, thereby effecting backward telescopic adjustment of the steering wheel 2. On the other hand, when the actuator rod 115 is moved or received into the main body 105 of the electric telescopic actuator 8, the upper column 4 and the steering shaft 3 are moved forward together with the stay 155, thereby effecting forward telescopic adjustment of the steering wheel 2.

In the second embodiment the electric tilt actuator 7 and the electric telescopic actuator 8 are composed of the same parts or components, which is effective in terms of the cost and assembling procedure. Specifically, in such arrangement the actuator main body 105, the actuator rod 115, and the like, are used in common, the number of kinds of metal molds required for die casting or rolling can be reduced and, at the same time, the mass productivity of the electric actuator can be largely enhanced, whereby reduction in the manufacturing cost can be realized. Also, since selection of an electric actuator is no longer required when it is assembled in the electric steering column apparatus 1, a responsibility of an assembling worker is reduced and a potential error in assembling is removed.

Figure 9:
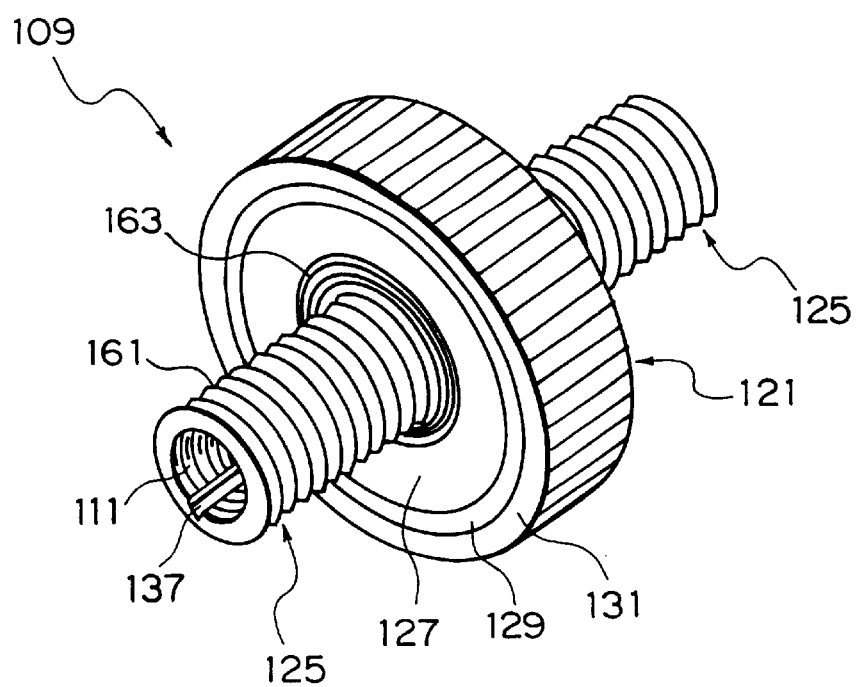
FIG. 9 is a perspective view for showing a variation of the gear shaft according to the second embodiment.
Figure 10:
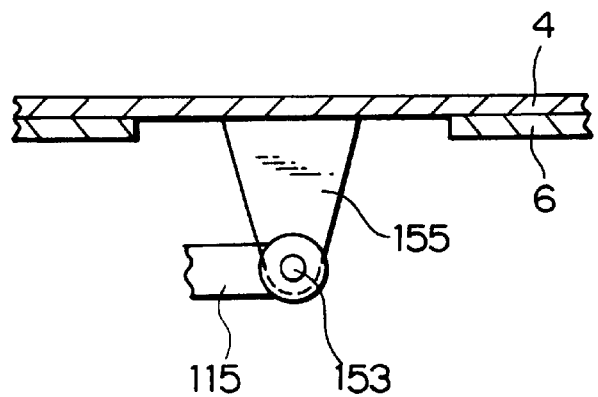
FIG. 10 is a view for explaining the positional relationship among an upper column, a lower column and an actuator rod.

In the second embodiment, a large number of the ridges 133 formed on the shaft portion 125 are employed as the first deformation portion and a large number of radial protrusions 135 formed on the driven gear portion 121 are employed as the second deformation portion. However, as shown in FIG. 9, annular protrusions 161 may be employed as the first deformation portion and concentric annular protrusions 163 may be employed as the second deformation portion.

As clearly seen from the above description, in the electric steering column apparatus according to the foregoing embodiments, the position detecting device detects the position of the steering shaft in a non-contact manner so that it is rendered possible to detect the position of the steering wheel in a simple manner with accuracy. Thus, fine adjustment and accurate control of the position of the steering wheel becomes possible. Note that when the position of the steering shaft is detected by a sensor of a contact type, such as a direct acting resistance sensor, such contact type sensor is inferior to that of a non contact type in the durability, and can not secure a range of a difference in voltage satisfactorily, whereby an accuracy in position detection is deteriorated. Further, such non contact type sensor is not susceptible to noises, compared with a contact type one, and is less influenced by a fluctuation in temperature.

With the structure in which the electric tilt actuator and the electric telescopic actuator are composed of the same parts or components, reduction in the manufacturing cost can be realized due to the reduction in the number of the metal molds or the improvement in mass productivity. In addition, in assembling into the electric power steering apparatus, selection of an electric actuator is no longer required so that a responsibility of an assembling worker is reduced and a potential error in assembling vanishes.

In the following embodiment, there is provided an automatic tilt and/or telescopic type steering apparatus which is capable of fixedly mounting a bracket on an inner column side to be coupled to a rod of a drive portion for a tilt or telescopic operation in a simple manner with accuracy.

Figure 11:
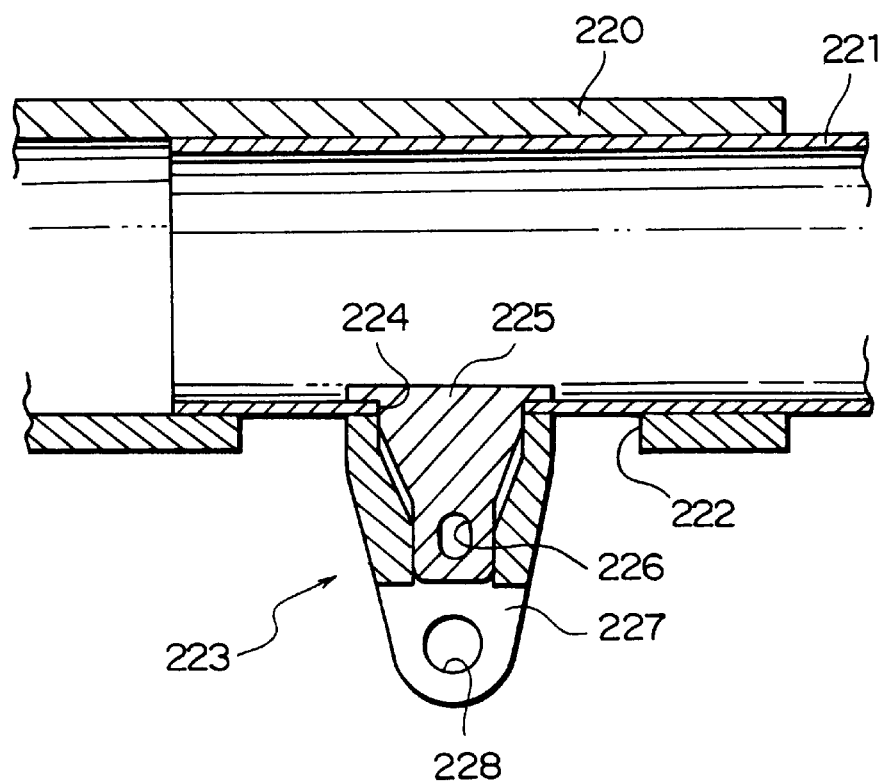
FIG. 11 is a longitudinal sectional view for showing of a portion of an automatic tilt and telescopic type steering apparatus according to a third embodiment of the present invention.
Figure 12:
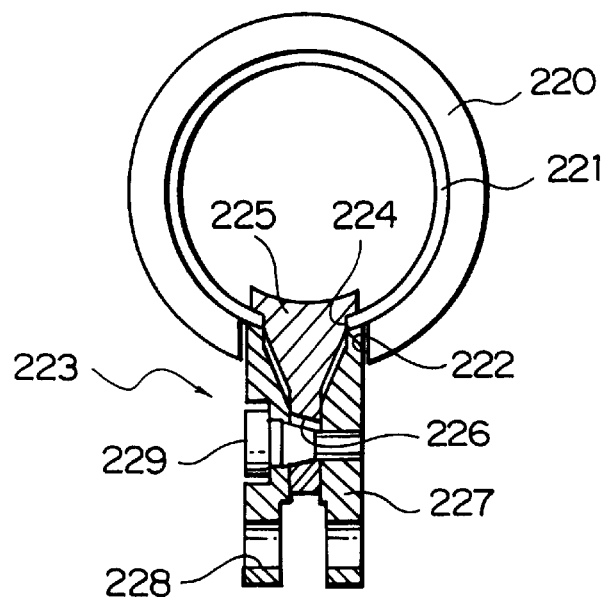
FIG. 12 is a latitudinal sectional view of the automatic tilt and telescopic type steering apparatus shown in FIG. 11.
Figure 13A:
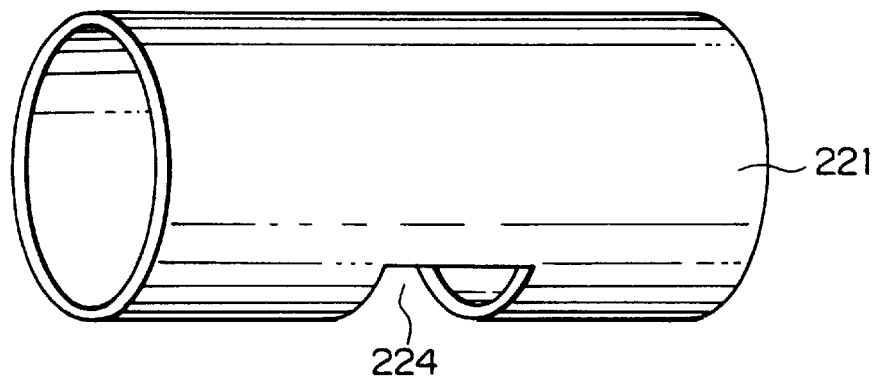
FIG. 13A is a perspective view of an inner column member of the automatic tilt and telescopic type steering apparatus shown in FIG. 11
Figure 13B:
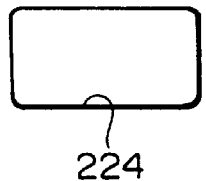
FIG. 13B is a front view of an opening of the inner column member shown in FIG. 13A.
Figure 14A:
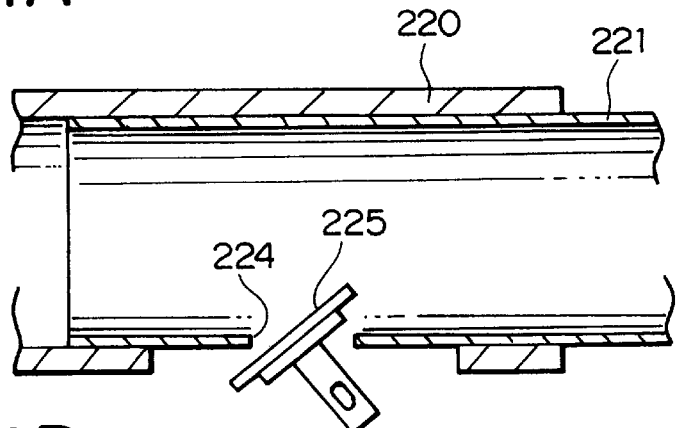
FIG. 14A is a longitudinal sectional view of the automatic tilt and telescopic type steering apparatus shown in FIG. 11
Figure 14B:
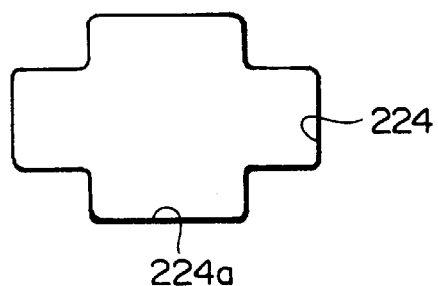
FIG. 14B is a front view of an opening of the inner column member shown in FIG. 14A.

FIG. 11 is a longitudinal sectional view of a portion of an automatic tilt and telescopic type steering apparatus according to the third embodiment of the present invention, and FIG. 12 is a transverse sectional view of the automatic tilt telescopic type steering apparatus shown in FIG. 11. FIG. 13A is a perspective view of an inner column member of the automatic tilt telescopic type steering apparatus shown in FIG. 11, and FIG. 13B is a front view of an opening of the inner column member shown in FIG. 13A. FIG. 14A is a longitudinal sectional view of the automatic tilt and telescopic type steering apparatus shown in FIG. 11, and FIG. 14B is a front view of an opening of the inner column member shown in FIG. 14A.

As shown in FIGS. 11 and 12, an inner column member 221 of a steering column is fitted in an outer column member 220 to be freely slidable, and a bracket 223 to be coupled to a rod of a drive portion for a tilt or telescopic operation is protruding through an opening 222 of this outer column member 220. Note that the opening 222 functions as a stopper in the telescopic operation.

The bracket 223 is provided with a fastening member 225 (auxiliary member) which is attached to an opening 224 formed on the inner bracket 221 in advance. This fastening member 225 is inserted in advance from inside of the inner column member 221, and is fitted in the opening 224 to be protruding from this opening 224 outwardly. Further, a tapered elongated attachment hole 226 is formed on this fastening member 225.

It is arranged that a bracket main body 227 is fitted on this fastening member 225. This bracket main body 227 has a pair of holes 228 for connection to the rod of the drive portion for a tilt or telescopic operation, and a taper bolt 229 is thread-engaged with the tapered elongated attachment hole 226.

In consequence, in order to attach this bracket 223 to the inner column member 221, after the inner column member 221 is fitted in the outer column member 220, the fastening member 225 is inserted in advance from inside of the inner column member 221 to be fitted in the opening 224, so as to be protruded from this opening 224 outwardly. Next, the bracket main body 227 is fitted on the fastening member 225, and the taper bolt 229 is thread-engaged with the tapered elongated attachment hole 226 of the fastening member 227. In this manner, the bracket 223 can be attached very easily. Moreover, the bracket 223 can be attached fixedly with accuracy and without using welding or other processing, and further, a sliding movement can be effected smoothly without impeding a sliding movement of the inner column member 221 with respect to the outer column member 220. In addition, the manufacturing cost is not increased, and the apparatus can be formed very light weighted.

Note that, as shown in FIG. 13A, the opening 224 of the inner column member 221 is formed to be rectangular. However, the shape of the opening is not limited to this, but may be another form.

Also, as shown in FIG. 14A, since cut portions 224*a* protruding in the circumferential direction are formed in the opening 224 of the inner column member 221, the fastening member 225 can be inserted into the inner column member 221 through the opening 224 and the cut portions 224*a*.

Figure 15:
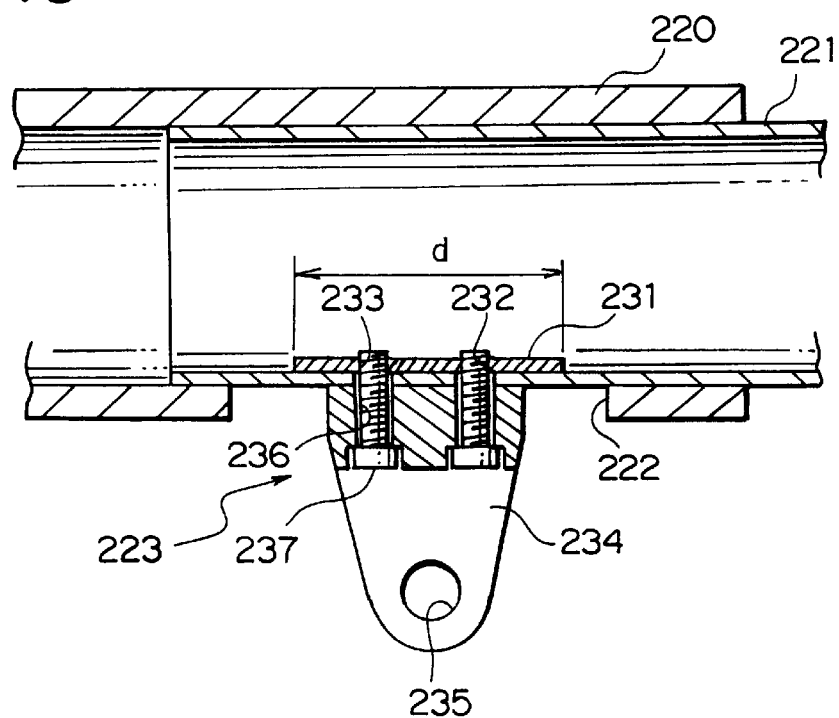
FIG. 15 is a longitudinal sectional view of an automatic tilt and telescopic type steering apparatus according to a fourth embodiment of the present invention.
Figure 16:
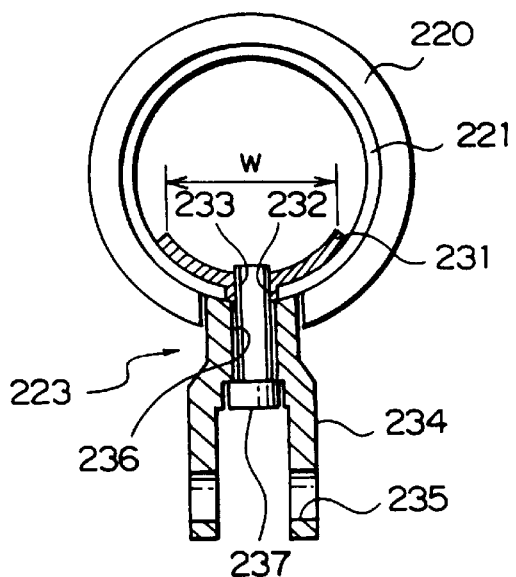
FIG. 16 is a transverse sectional view of the automatic tilt and telescopic type steering apparatus shown in FIG. 15.
Figure 18:
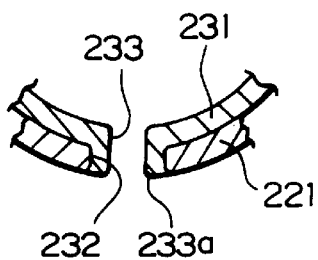
FIG. 18 is a partial sectional view of an inner column member of the automatic tilt and telescopic type steering apparatus shown in FIG. 15.
Figure 17:
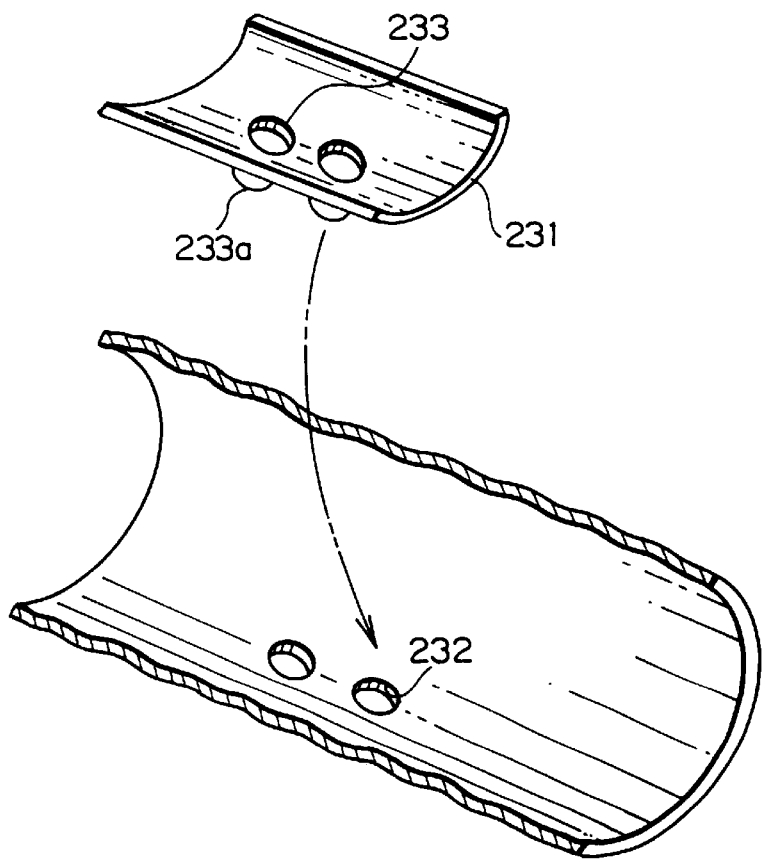
FIG. 17 is a partial perspective view of an inner column member of the automatic tilt and telescopic type steering apparatus shown in FIG. 15.

Next, FIG. 15 is a longitudinal sectional view of a portion of an automatic tilt and telescopic type steering apparatus according to the fourth embodiment of the present invention, FIG. 16 is a transverse sectional view of the automatic tilt and telescopic type steering apparatus shown in FIG. 15, and FIG. 17 is a partial perspective view of an inner column member of the automatic tilt and telescopic type steering apparatus shown in FIG. 15. FIG. 18 is a partial sectional view of the inner column member of the automatic tilt and telescopic type steering apparatus shown in FIG. 15.

As shown in FIGS. 15 and 16, according to the present embodiment, a bracket 223 to be coupled to a rod of a drive portion for a tilt or telescopic operation has a back plate 231 which is attached to a round hole (opening) 232 of the inner column member 221. A burring hole 233 is formed in this back plate 231. At this burring work, burring piece 233*a* is elevatingly formed around this burring hole 233, as shown in FIGS. 17 and 18.

When this back plate 231 is set to the round hole 232 of the inner column member 221, as shown in FIG. 18, the burring piece 233*a* of the back plate 231 is inserted in the round hole 232 of the inner column member 221 and then this burring piece 233*a* is caulked. Next, a female screw is formed inside the burring hole 233 of this back plate 231. In such a state, the back plate 231 is sub-assembled in the inner column member 221. Note that this caulking and the formation of the female screw may be conducted at the same time.

The arrangement may be such that after sub-assembling of a back plate with a burring hole on which a female screw is formed in advance, the female screw is fixed by caulking without being smashed.

It is arranged that a bracket main body 234 is mounted on this back plate 231. This bracket main body 234 has a pair of holes 235 to be coupled to the rod of the drive portion for a tilt or telescopic operation, as well as an attachment hole 236 into which a bolt 237 is inserted to attach the bracket main body 234 to the back plate 231.

In consequence, when this bracket 223 is attached to the inner column member 221, the burring piece 233a of the back plate 231 is inserted into the round hole 232 of the inner column member 221 and then this burring piece 233a is caulked, whereby the back plate 231 is set to the round hole 232 of the inner column member 221. After this caulking or simultaneously therewith, the female screw is formed in the burring hole 233 of the back plate 231, and in such a state, the back plate 231 is sub-assembled in the inner barrel 221.

Next, after the inner column member 221 is fitted in the outer column member 220, the bracket main body 234 is attached, and the bolt 237 is inserted into the attachment hole 236 to be engaged with the female screw of the burring hole 233 of the back plate 231 to be fastened. In such a manner, the bracket 223 can be attached very easily. Moreover, the bracket 223 can be attached fixedly with accuracy and without using welding or other processing, and further, a sliding movement can be effected smoothly without impeding a sliding movement of the inner column member 221 with respect to the outer column member 220. In addition, the manufacturing cost is not increased, and the apparatus can be formed very light weighted.

Note that there is provided a single or a plurality of bolts 237, instead of two bolts, if needed. The length (d) of the back plate 231 is arranged to be larger than that of the bracket main body 234, thereby enhancing the rigidity of the steering column. The width (W) of the back plate 231 is also larger than that of the bracket main body 234, in the same manner, to expand a stress distribution, thereby enhancing the rigidity of the steering column. Further, though not shown in the drawing, the back plate may be formed in a pipe shape, instead of an arcuate shape, to further extend the stress distribution. Further, this fourth embodiment is suitable for the tilt and telescopic type steering apparatus of the so-called upper part rocking type shown in FIG. 1.

As described above, according to the third and fourth embodiments of the present invention, for attachment of the bracket on the inner column member side for connection to the rod of the drive portion, the bracket main body is assembled in the auxiliary member after the auxiliary member is set inside the inner column member in advance. Accordingly, the attachment of the bracket can be conducted very easily. Moreover, the bracket can be attached fixedly with accuracy and without using welding or other processing, and a sliding movement of the inner column member with respect to the outer column member can be also conducted smoothly. In addition, the manufacturing cost is not increased, and the apparatus can be formed very light weighted.

Figure 19:
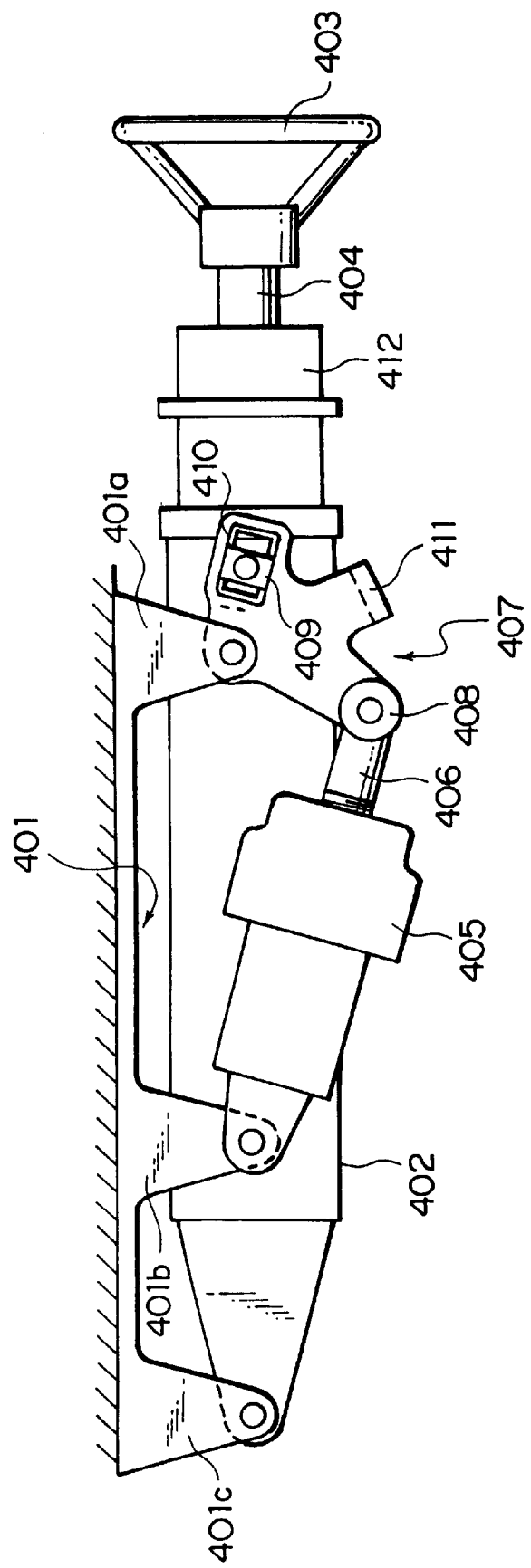
FIG. 19 is a side view of an electric tilt steering apparatus according to a fifth embodiment of the present invention.
Figure 20:
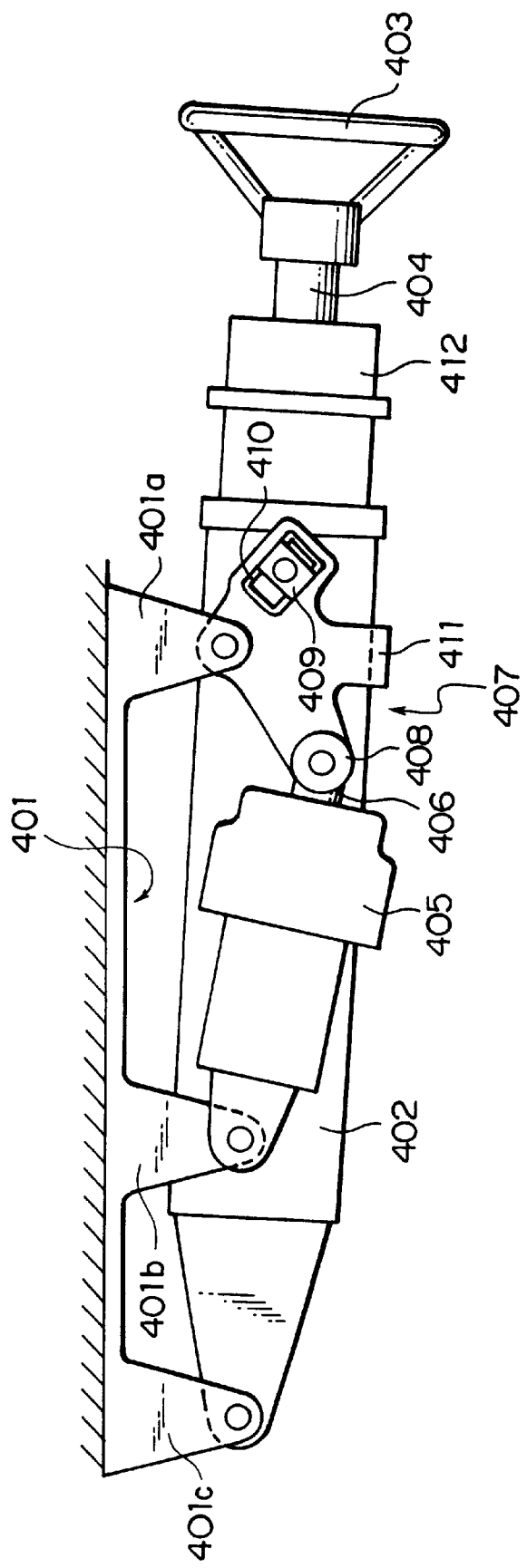
FIG. 20 is a side view of the electric tilt steering apparatus shown in FIG. 19, for showing the lowermost tilt position.
Figure 21:
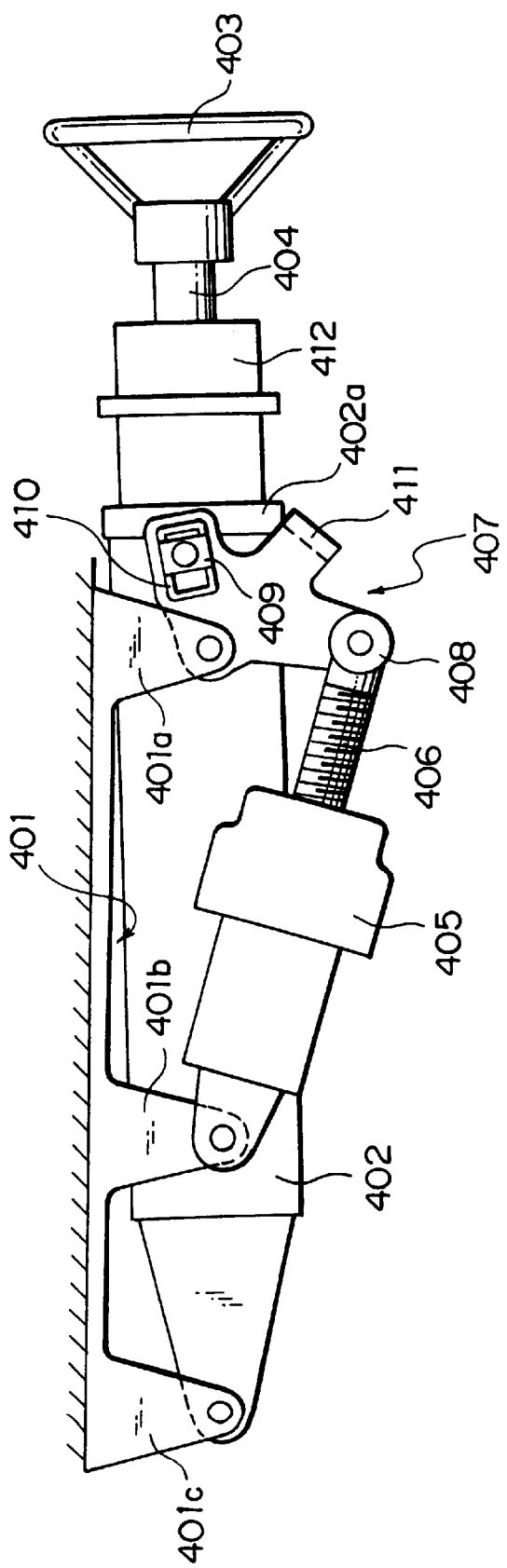
FIG. 21 is a side view of the electric tilt steering apparatus shown in FIG. 19, for showing the uppermost tilt position.
Figure 22:
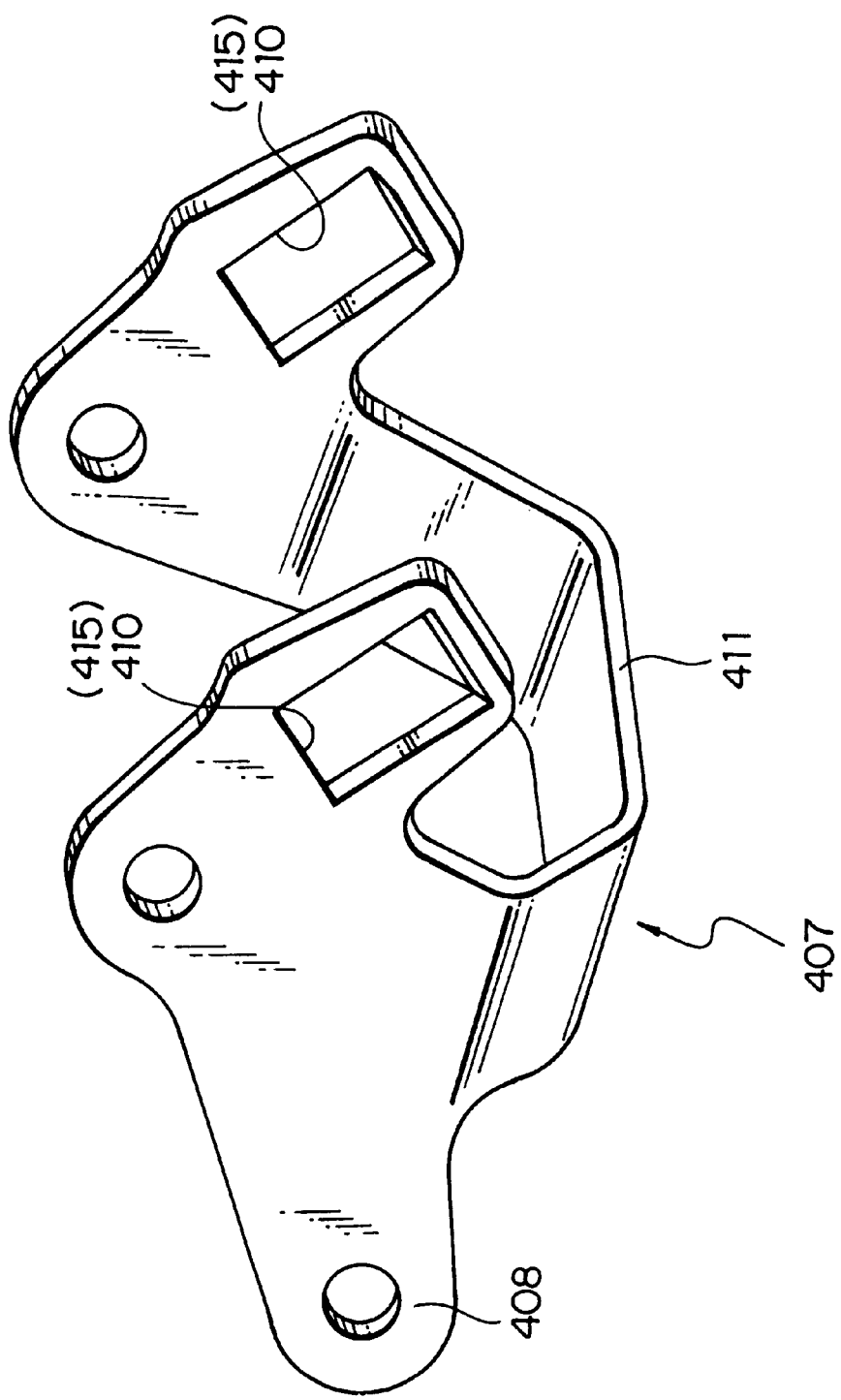
FIG. 22 is a perspective view of a tilt rocking member mounted on the electric tilt steering apparatus shown in FIG. 19.

FIG. 19 is a side view of an electric tilt steering apparatus according to the fifth embodiment of the present invention. FIG. 20 is a side view of the electric tilt steering apparatus shown in FIG. 19, for showing the tilt lowermost position, while FIG. 21 is a side view of the electric tilt steering apparatus shown in FIG. 19, for showing the tilt uppermost position. FIG. 22 is a perspective view of a tilt rocking member attached to the electric tilt steering apparatus shown in FIG. 19.

In the fifth embodiment, as shown in FIG. 19, an attachment bracket 401 comprising upper and lower parts as a unitary structure is provided on the car body, and this attachment bracket 401 is provided with an upper attachment part 401a, a drive portion attachment part 401b and a lower attachment part 401c.

The lower end of a steering column 402 in a front part of the car is rockably supported on the lower attachment part 401c of this attachment bracket 401 by means of an unrepresented pin. Also, inside this steering column 402, a steering shaft 404 coupled to a steering wheel 403 is rotatably supported. This steering shaft 404 is also provided with an unrepresented universal joint at the lower end thereof in the front part of the car so that it can rock correspondingly to the tilt center. Thus, the steering apparatus is configured as a so-called lower part rocking type steering apparatus.

The base of a drive portion 405 containing an unrepresented electric motor therein is rockably provided in the drive portion attachment part 401b of the attachment bracket 401. This drive portion 405 is provided with a rod 406 which is (moved outward) extended or contracted (moved inward) by the unrepresented electric motor through unrepresented gear and feed screw mechanism.

A tilt rocking member 407 is pivotally supported to be rockable by the upper attachment part 401a of the attachment bracket 401. The tilt rocking members 407 are provided with a pair of side plate portions to be substantially symmetrical, as shown in FIG. 22. The tilt rocking member 407 is integrally formed to be U-shaped so as to embrace the steering column 402 from below. Note that the tilt rocking member 407 is made of sheet metal by pressing in this embodiment, but may be made of a light alloy such a aluminum or magnesium by casting if a higher rigidity is required.

This tilt rocking member 407 has an engagement portion 408 engaged with the tip end of the rod 406, as well as a slide frame portion 410 for causing a sliding piece 409 protruding from the steering column 402 to slide. The tilt rocking member 407 also has a contact support portion 411 which is brought into contact with the steering column 401 to lift it up at the time of tilt ascent, and embraces to support the steering column 402 at the time of tilt descent. Note that the sliding piece 409 and the slide frame portion 410 will be fully described with reference to FIG. 26 and the drawings subsequent thereto.

With the tilt steering apparatus configured as stated above, the rod 406 may be moved inward or contracted by means of the drive portion 405 at the tilt descent, as shown in FIG. 20, to rock the tilt rocking member 407 clockwise. Then, the sliding piece 409 is caused to slide inside the slide frame portion 410 to rock together with the steering column 402, thereby incline the steering column 402 to a desired position downward.

Note that, as shown in FIG. 20, it is arranged such that the above-mentioned contact support portion 411 embraces to support the steering column 402 from below at the tilt lowermost position, thereby attaining the tilt decent lower limit, while a surface of this contact support portion 411 is aligned with a surface of the steering column 402, to thereby disperse the load.

On the other hand, at the time of tilt ascent, as shown in FIG. 21, the rod 406 is moved outward or extended by means of the drive portion 405 to rock the tilt rocking member 407 counter-clockwise. Then, the sliding piece 409 is caused to slide inside the slide frame portion 410 to rock together with the steering column 402, thereby incline the steering column 402 to a desired position upward.

The tilt ascent limit is attained by bringing the contact support portion 411 into contact with the steering column 402. In this case, since the both members are in a point contact, the strength of the structure is required to taken into consideration. For example, there are measures to be taken including: (a) to increase the thickness of the thick portion 402a of the steering column 402 which is in contact with the contact support portion 411; (b) to increase the rigidity by providing ribs at two positions of the steering column 402 which is in contact with the contact support portion 411; (c) to chamfer the corners of the contact support portion 411; and (d) to bring the contact support portion 411 into contact with the steering column 402 at a side of the contact support portion 411 (a surface in the direction of thickness).

As seen from the above description, since the apparatus of the present embodiment is not of the so-called upper part rocking type, the steering shaft 404 and the steering column 402 are not required to be divided into upper and lower parts so that the number of the constituent parts can be reduced to decrease the manufacturing cost.

When a load (vibration) is input from the steering wheel 403 side to the front part of the car downward, this load (vibration) in the vertical direction works indirectly on the rod 406 through the tilt rocking member 407 in a predetermined lever ratio, so that the rigidity of the rod 406 is not required to be so high. Also, so high-level countermeasures are not required for a backlash which may be caused by the vibration.

Further, it is arranged that the tilt rocking member 407 is rocked and the sliding piece 409 is, while sliding inside the slide frame portion 410, rocked together with the steering column 402 at the time of tilt adjustment so that a movement in the axial direction generated in the tilt rocking member 407 is absorbed by the sliding piece 409 by sliding inside the slide frame portion 410. Accordingly, unlike in a conventional apparatus, the tilt center such as a pin can be provided at the lower end of the steering column 402 and the steering column 402 can receive a load or vibration in the axial direction from the steering wheel 403.

Note that according to the fifth embodiment, the steering column 402 serves as the outer column member, and in this steering column a telescopic inner column member 412 is slidably fitted. Thus, a telescopic drive mechanism may be constituted in the same manner as the above-mentioned tilt drive mechanism.

Figure 23:
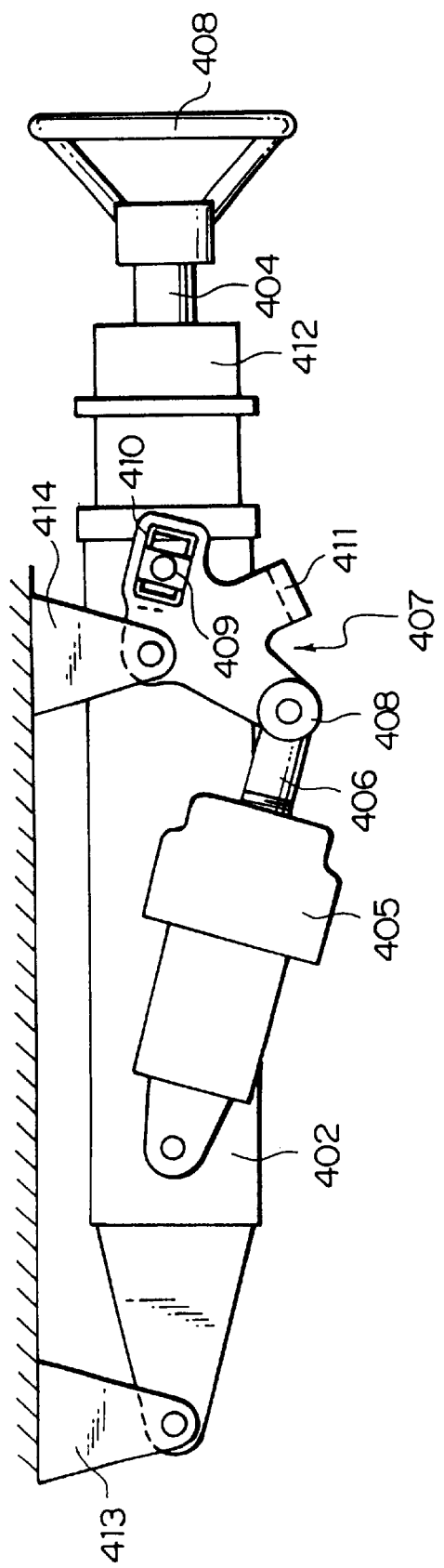
FIG. 23 is a side view of an electric tilt steering apparatus according to a sixth embodiment of the present invention.
Figure 24:
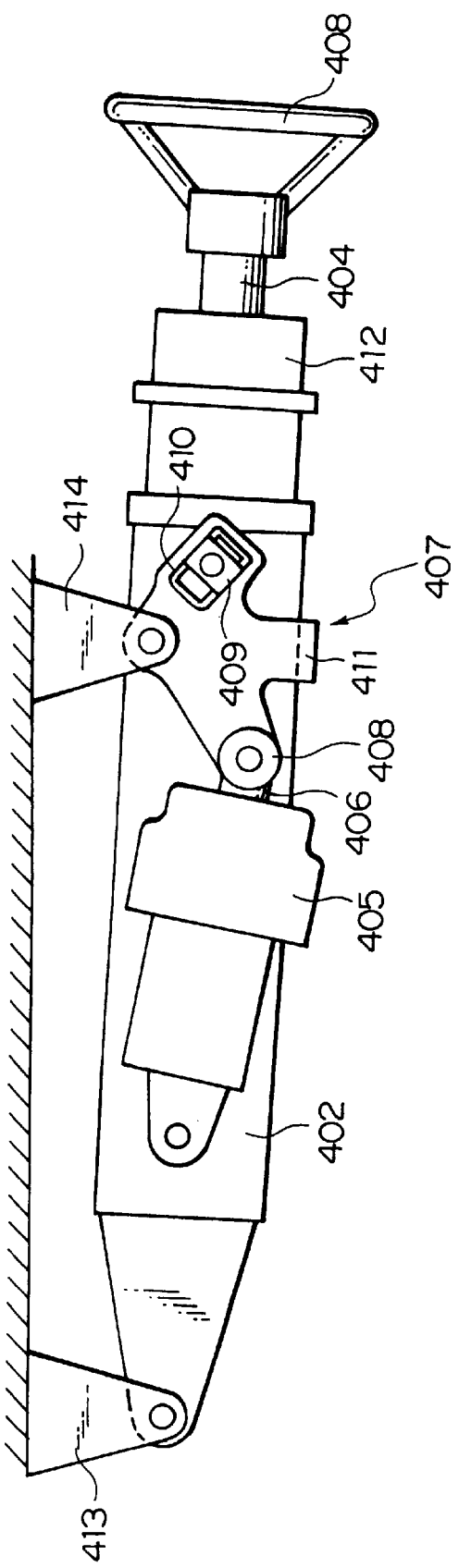
FIG. 24 is a side view of the electric tilt steering apparatus shown in FIG. 23, for showing the lowermost tilt position.
Figure 25:
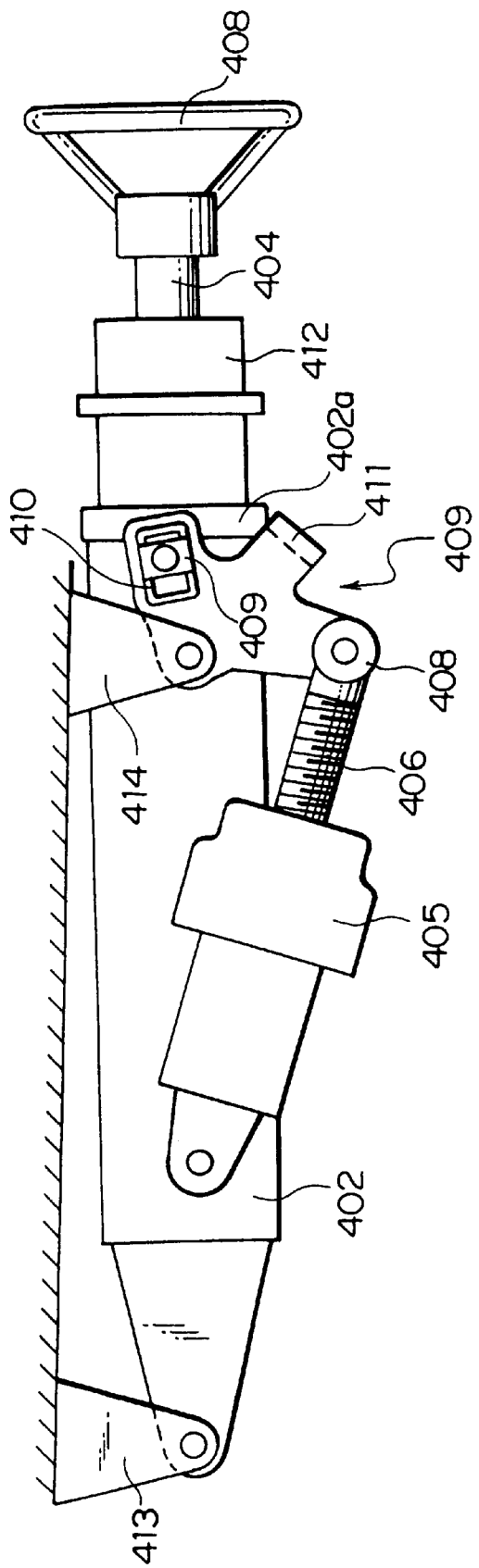
FIG. 25 is a side view of the electric tilt steering apparatus shown in FIG. 23, for showing the uppermost tilt position.

Next, the sixth embodiment of the present invention will be described with reference to FIGS. 23 to 25. FIG. 23 is a side view of an electric tilt steering apparatus according to the sixth embodiment of the present inventions, FIG. 24 is a side view of the electric tilt steering apparatus shown in FIG. 24, for showing the lowermost tilt position, and FIG. 25 is a side view of the electric tilt steering apparatus shown in FIG. 24, for showing the uppermost tilt position.

The sixth embodiment is constituted entirely in the same manner as the fifth embodiment, except for the attachment bracket. In the fifth embodiment, there is provided the attachment bracket 401 which comprises the upper attachment part 401a, the drive portion attachment part 401b and the lower attachment part 401c. On the other hand, in the sixth embodiment, the lower end of the steering column 402 is attached to the car body by means of a simple bracket 413 which is separately provided. In the same manner, the tilt rocking member 407 is rockably attached to the car body by means of another simple bracket 414 separately provided. The base end of the drive portion is rockably mounted on a side of the steering column 402.

Figure 26:
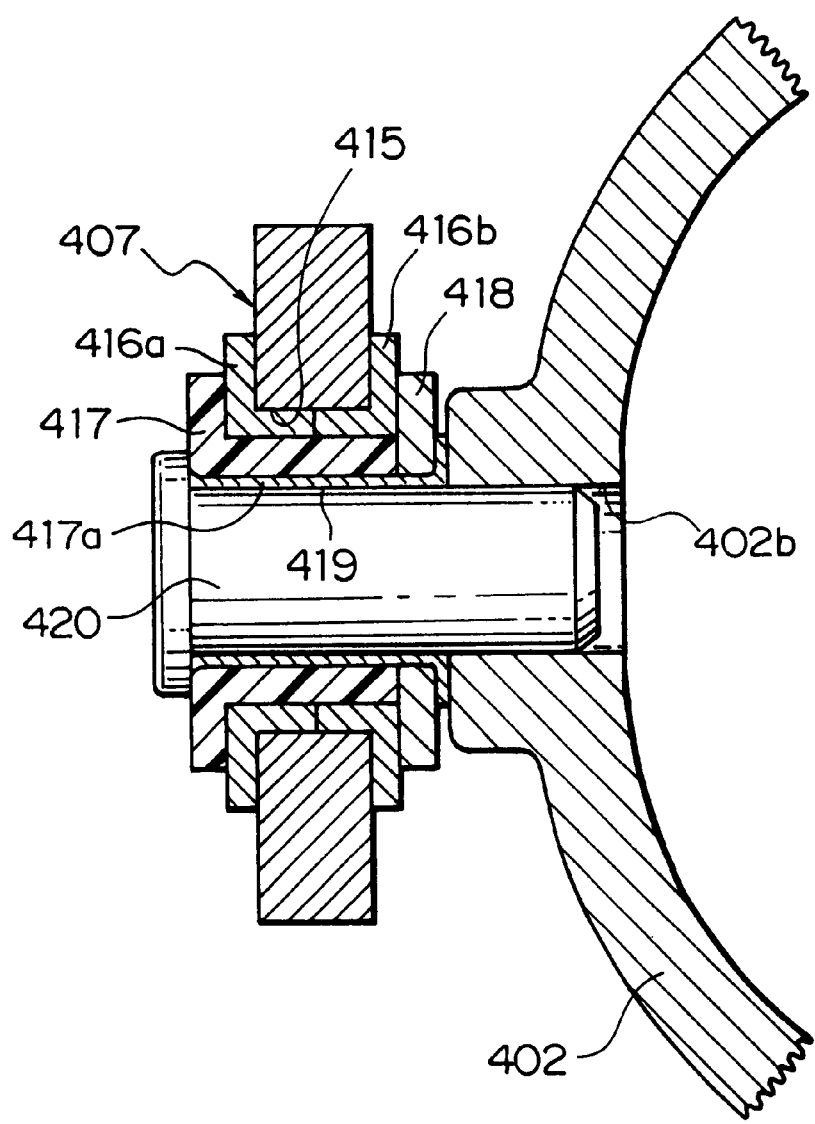
FIG. 26 is an enlarged sectional view for showing a sliding piece and a slide frame portion.

Next, the sliding piece 409 and the slide frame portion 410 will be fully described with reference to FIGS. 26 to 28. FIG. 26 is an enlarged sectional view of the sliding piece and the slide frame portion, FIG. 27 is an exploded perspective view for showing the sliding piece and the slide frame portion, respectively, in an exploded manner, and FIGS. 28A, 28B, 28C and 28D are perspective views of a slider and a contact plate, respectively.

As shown in FIGS. 26 and 27, on the side of the slide frame portion 410, there is provided an elongated hole 415 in substantially rectangular form on the tilt rocking member 407, and a pair of resin guides 416a, 416b are attached to this elongated hole 415.

On the other hand, on the side of the sliding piece 409, there are provided a slider 417 made of resin or plastic for sliding on the inner side of the resin guides 416a, 416b, and a contact plate 418 to be contacted with this slider 417. A pin 420 is inserted into a through hole 417a of this slider 417 via a thin resin bush 419. This pin 420 is thrust with pressure into a through hole 402b of the steering column 402 after the contact plate 418 is mounted.

Accordingly, it is arranged such that the slider 417 slides on the inner side of the resin guides 416a, 416b when the sliding piece 409 slides in the slide frame portion 410 at the tilt rocking, thereby obtaining smooth sliding movements.

Figure 28A:
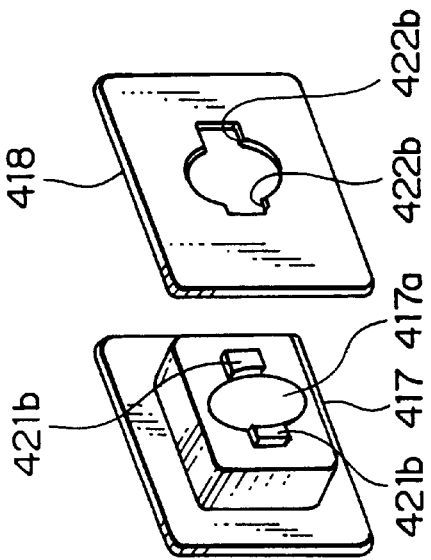
FIG. 28 is comprised of perspective views FIG. 28A, FIG. 28B, FIG. 28C, and FIG. 28D, for respectively showing a slider and a contact plate.
Figure 28B:
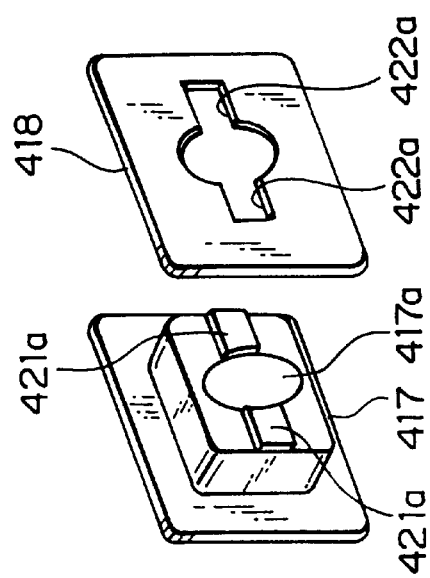
Figure 28C:
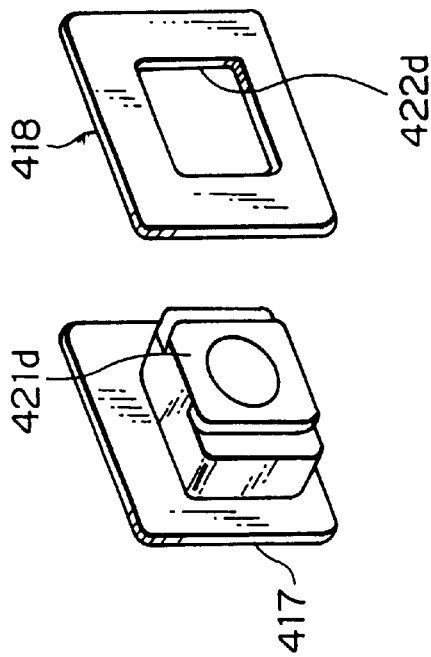
Figure 28D:
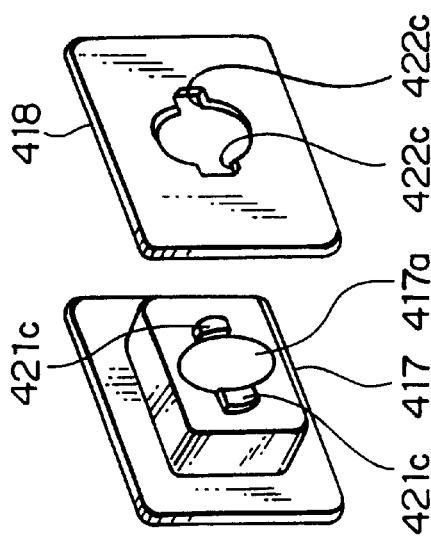

Note that at the time of assembling, while on the side of the slider frame portion 410 the pair of resin guides 416a, 416b are attached to the elongated hole 415, the slider 417 and the contact plate 418 are inserted into the pin 420 through the bush 419, and this pin 420 is thrust with pressure into the through hole 402b of the steering column 402. The steering apparatus can be thus assembled in an easy manner. In addition, a face of the elongated hole of the tilt rocking member 407 is not required to be processed with high accuracy so long that the resin guides 416a, 416b can be set in this elongated hole without backlash. Further, as shown in FIG. 26, if the pair of resin guides 416a, 416b are clearance-fit at both contact portions, the tilt rocking bracket 407 can be sandwiched therebetween tightly at the time of assembling when the pin 420 is thrust with pressure. For attaching the resin guides 416a, 416b to the elongated hole 415, the resin guides 416a, 416b may be integrally formed with the elongated hole 415 of the tilt rocking member 407 in a tightly contact manner from the first, or the resin guides 416a, 416b may be formed in a unitary structure, instead of two divided parts of one arrangement, and then fit into the elongated hole 415 by using the flexibility of the resin guides. Further, since protrusions 421a for preventing displacement is formed on the slider 417, as shown in FIG. 28A, grooves 422a in which this protrusions are to be fitted may be formed on the contact plate 418. Still further, as a variation of the configuration, protrusions 421b for preventing displacement may be formed on the slider 417 and grooves 422b in which the protrusions are to be fitted may be formed on the contact plate 418, as shown in FIG. 28B. As another variation of the configurations, protrusions 421c for preventing displacement may be formed on the slider 417 and grooves 422c in which the protrusions are to be fitted may be formed on the contact plate 418, as shown in FIG. 28C. Still another variation of the configuration, protrusions 421d for preventing displacement may be formed on the slider 417 and grooves 422*c* in which the protrusions are to be fitted may be formed on the contact plate 418, as shown in FIG. 28D.

Figure 29:
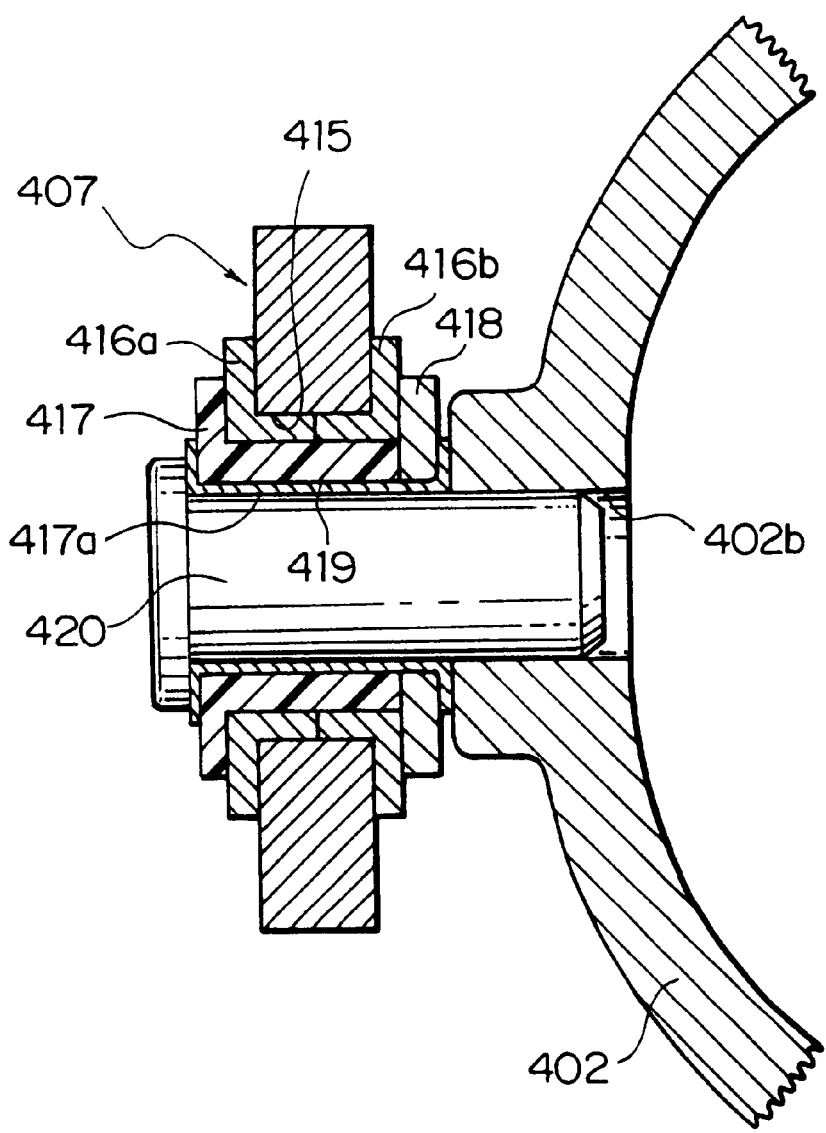
FIG. 29 is an enlarged sectional view of the sliding piece and the slide frame portion.
Figure 30:
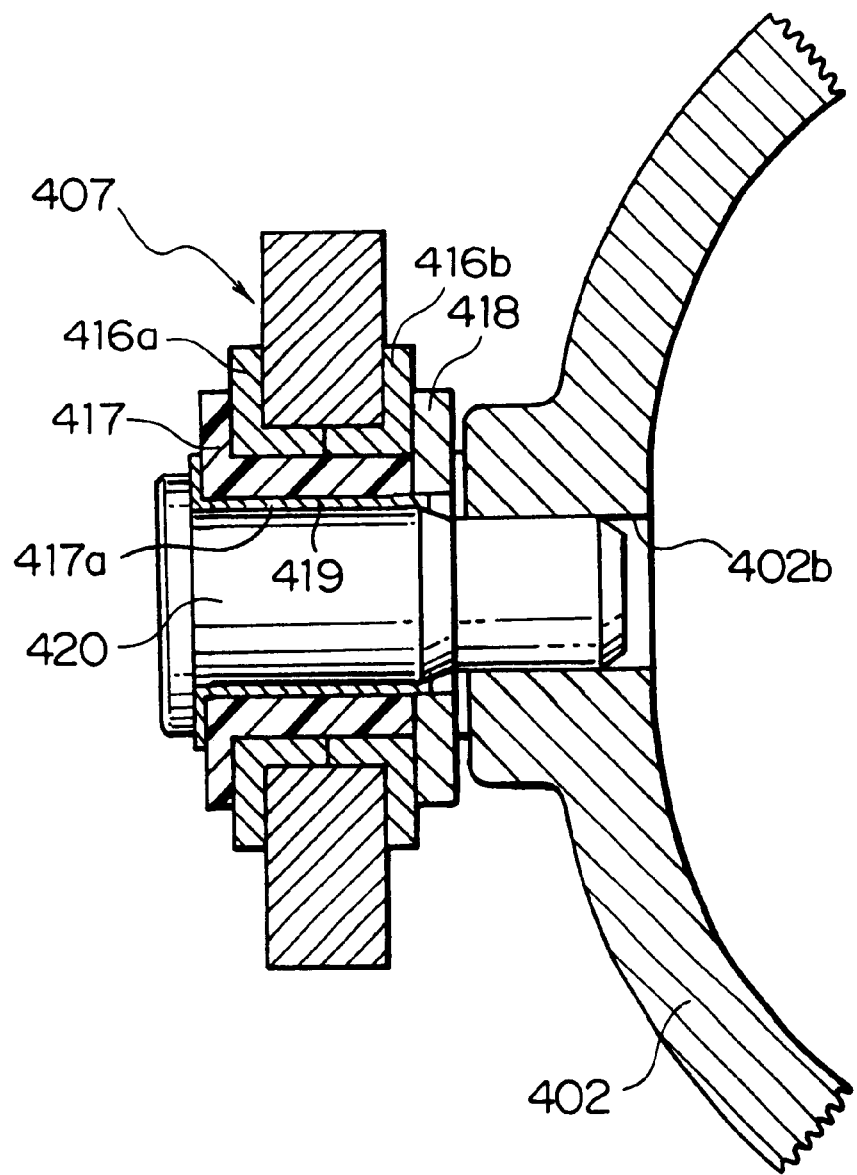
FIG. 30 is another enlarged sectional view of the sliding piece and the slide frame portion.
Figure 31:
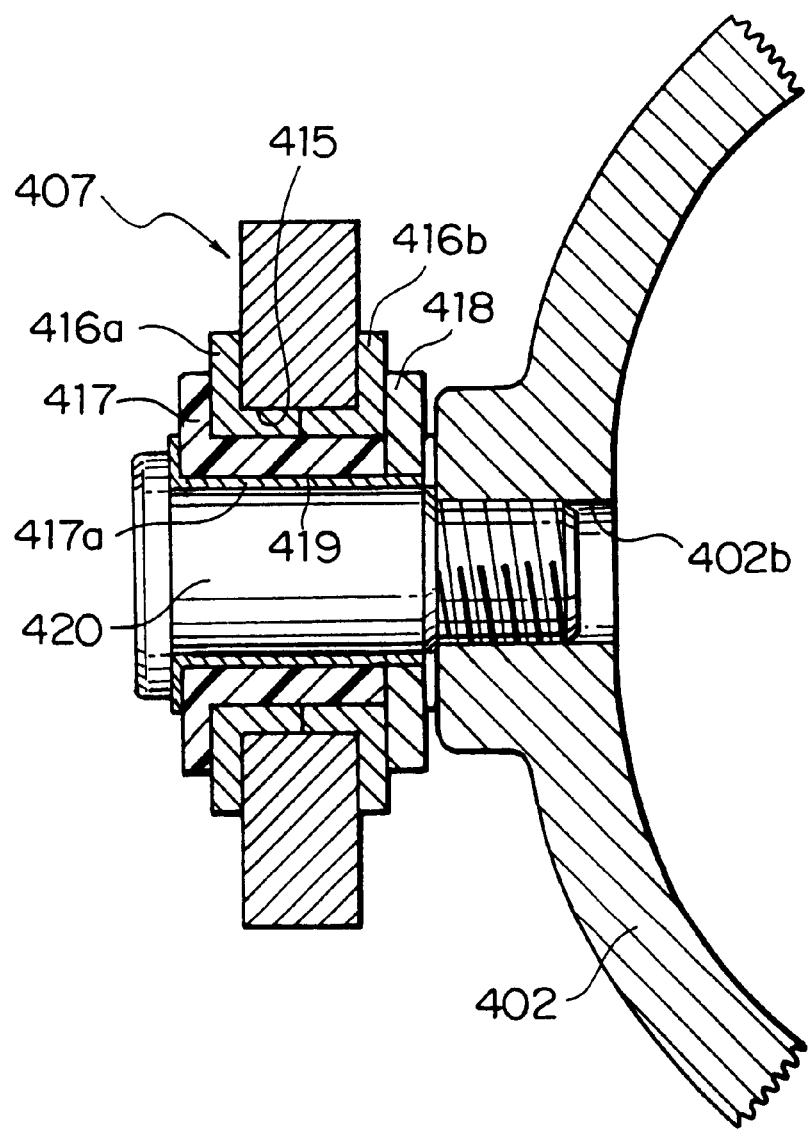
FIG. 31 is a still another enlarged sectional view of the sliding piece and the slide frame portion.

As shown in FIG. 29, the thin resin or plastic bush 419 mentioned above may be fitted in a different direction. Further, as shown in FIG. 30, it is possible to reduce the size of the tip edge of the pin 420 and the diameter of the through hole 402*b* of the steering column 402 so that the pin may be thrust with pressure in the through hole. Further, as shown in FIG. 31, the tip edge of the pin 420 may be threaded so as to be threadably engaged with the female screw through hole 402*b* of the steering column 402.

As described above, since the apparatus according to the fifth and sixth embodiments is not of the so-called upper part rocking type, the steering shaft and the steering column are not required to be divided into upper and lower parts so that the number of the constituent parts can be reduced to decrease the manufacturing cost.

When a load (vibration) is input from the steering wheel side in the front part of the car downward, this load (vibration) in the vertical direction works indirectly on the rod through the tilt rocking member in a predetermined lever ratio, so that the rigidity of the rod is not required to be so high. Also, so high-level countermeasures are not required for a backlash which may be caused by the vibration.

Further, it is arranged such that the tilt rocking member is rocked and the sliding piece is, while sliding inside the slide frame portion, rocked together with the steering column at the tilt adjustment time so that the movement in the axial direction generated in the tilt rocking member is absorbed by the sliding piece by sliding inside the slide frame portion. Accordingly, unlike in a conventional apparatus, the tilt center such as a tilt pin can be provided at the lower end of the steering column and the steering column can receive a load or vibration in the axial direction from the steering wheel.

What is claimed is:

1. An electric steering column apparatus comprising:
   a steering shaft with a steering wheel mounted at a rear end thereof;
   a steering column through which said steering shaft is rotatably supported, said steering column including an upper column member, a middle column member and a fixed lower column member, said upper column member being rotatably connected to said middle column member, and said middle column member being supported by said lower column member so as to be telescopically moveable in an axial direction relative to said lower column member;
   an electric tilt actuator operably connected to said upper column member and said middle column member to tilt said upper column member relative to said middle column member about a pivot;
   a tilt position detector which detects a tilt position of said upper column member in a non-contact manner;
   an electric telescopic actuator operably connected to said middle column member and said lower column member to telescope said middle column member relative to said lower column member; and
   a telescopic position detector which detects a telescopic position of said middle column with respect to said lower column member in a non-contact manner;
   said electric tilt actuator and said electric telescopic actuator being disposed further from the rear end of said steering shaft than said pivot along the axial direction of said steering shaft.

2. An electric steering column apparatus according to claim 1, wherein:
   at least one said actuator includes an electric motor held by a main body of that actuator and a rod drive mechanism; and
   said rod drive mechanism includes a driven gear portion to be driven by a driving gear on an electric motor side and a shaft portion to be driven through said driven gear portion.

3. An electric steering column apparatus according to claim 1, wherein said electric tilt actuator and said electric telescopic actuator have one and the same structure.

4. An electric steering column apparatus according to claim 3, wherein said electric tilt actuator and said electric telescopic actuator are composed of the same parts, respectively.

5. An electric steering column apparatus according to claim 1, wherein:
   at least one said electric actuator has an electric motor held by a main body of that actuator and a rod drive mechanism; and
   said rod drive mechanism includes a gear shaft comprised of a driven gear portion to be driven by a driving gear on the electric motor side and a shaft portion to be rotatably held by said actuator main body through a bearing.

6. An electric steering column apparatus according to claim 5, wherein a deformation portion protruding from an inner diameter of said bearing is formed on an outer peripheral surface of said shaft portion.

7. An electric steering column apparatus according to claim 5, wherein a second deformation portion to be brought into contact with a side of an inner race of said bearing is formed on a side of said driven gear portion.

8. An electric steering column apparatus according to claim 5, further comprising an actuator rod, and wherein a female screw is formed on an axis of said gear shaft, a male screw is provided on said actuator rod for engaging said female screw, and a lubricant oil retaining groove is formed on said female screw.

9. An electric steering column apparatus according to claim 5, wherein said driven gear portion is comprised of a gear base, a ring gear on said gear base, and an elastic member interposed between said gear base and said ring gear.

10. An electric steering column apparatus according to claim 5, wherein said electric tilt actuator and said electric telescopic actuator have one and the same structure.

11. An electric steering column apparatus according to claim 1, wherein said electric tilt actuator and said electric telescopic actuator are separate and independent from each other.

12. An electric steering column apparatus according to claim 1, wherein at least one of said tilt position detector and said telescopic position detector detects position magnetically or electrostatically.

* * * * *

UNITED STATES PATENT AND TRADEMARK OFFICE
CERTIFICATE OF CORRECTION

PATENT NO.    : 6,711,965 B2
DATED         : March 30, 2004
INVENTOR(S)   : Masaki Tomaru et al.

It is certified that error appears in the above-identified patent and that said Letters Patent is hereby corrected as shown below:

<u>Title page,</u>
Item [75], Inventor, please delete the following "Takahiro Saito, Maebashi (JP)"

Signed and Sealed this

Twenty-sixth Day of July, 2005

JON W. DUDAS
*Director of the United States Patent and Trademark Office*